(12) United States Patent
Shiota

(10) Patent No.: US 7,055,015 B2
(45) Date of Patent: May 30, 2006

(54) INFORMATION PROCESSING APPARATUS IN WHICH PROCESSES CAN REDUCE OVERHEAD OF MEMORY ACCESS AND EFFICIENTLY SHARE MEMORY

(75) Inventor: Noriyuki Shiota, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 329 days.

(21) Appl. No.: 10/370,726

(22) Filed: Feb. 24, 2003

(65) Prior Publication Data

US 2003/0177332 A1 Sep. 18, 2003

(30) Foreign Application Priority Data

| Feb. 25, 2002 | (JP) | 2002-048514 |
| Feb. 25, 2002 | (JP) | 2002-048515 |
| Feb. 21, 2003 | (JP) | 2003-044585 |
| Feb. 21, 2003 | (JP) | 2003-044586 |
| Feb. 21, 2003 | (JP) | 2003-044587 |
| Feb. 21, 2003 | (JP) | 2003-044588 |

(51) Int. Cl.
*G06F 12/00* (2006.01)

(52) U.S. Cl. .................... 711/203; 711/202
(58) Field of Classification Search ........ 711/202–203, 711/205–209
See application file for complete search history.

(56) References Cited

U.S. PATENT DOCUMENTS

| 5,835,964 | A | * | 11/1998 | Draves et al. | 711/207 |
| 5,928,352 | A | * | 7/1999 | Gochman et al. | 712/200 |
| 5,940,868 | A | * | 8/1999 | Wagner | 711/203 |
| 6,125,433 | A | * | 9/2000 | Horstmann et al. | 711/160 |
| 6,256,715 | B1 | * | 7/2001 | Hansen | 711/163 |
| 6,401,185 | B1 | * | 6/2002 | Sexton et al. | 711/209 |
| 6,477,612 | B1 | * | 11/2002 | Wang | 711/2 |
| 6,490,671 | B1 | * | 12/2002 | Frank et al. | 711/207 |
| 2004/0073765 | A1 | * | 4/2004 | Arimilli et al. | 711/202 |

FOREIGN PATENT DOCUMENTS

| JP | 62-100851 | 5/1987 |
| JP | 7-160583 | 6/1995 |
| JP | 2002-84383 | 3/2002 |

* cited by examiner

*Primary Examiner*—Nasser Moazzami
(74) *Attorney, Agent, or Firm*—Oblon, Spivak, McClelland, Maier & Neustadt, P.C.

(57) ABSTRACT

The information processing apparatus reserves a direct mapping region in the physical memory space and correlates physical addresses of the direct mapping region in the physical memory space with the virtual addresses of the virtual memory region in the virtual memory space of a process. Accordingly, the number of exception errors caused by the address translating unit is reduced, and the overhead on memory accesses is reduced.

58 Claims, 21 Drawing Sheets

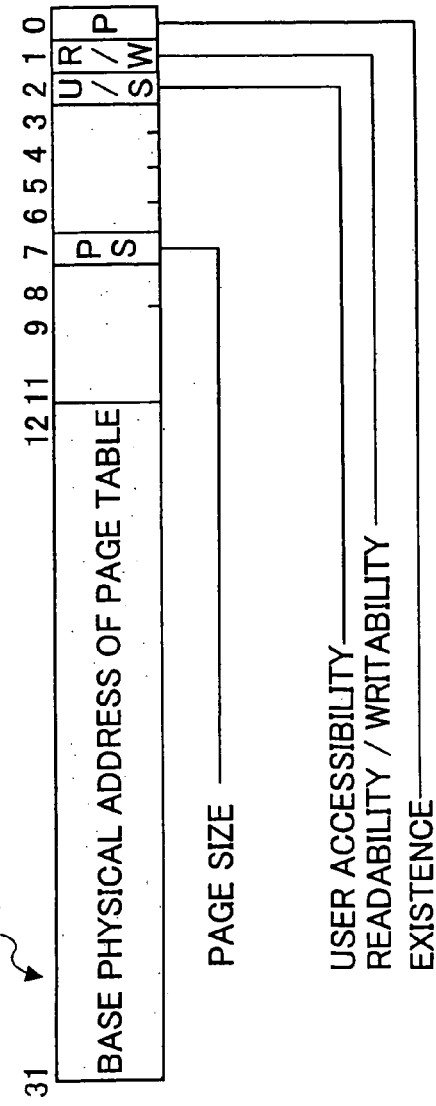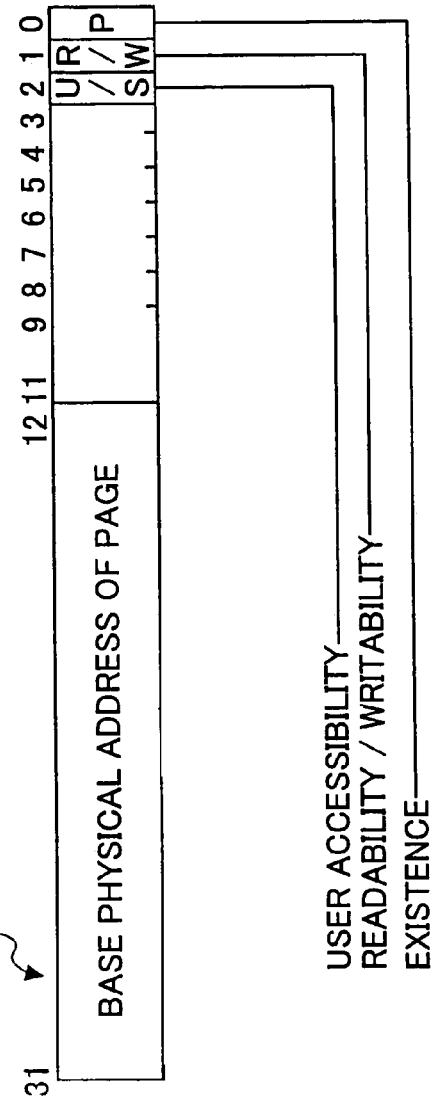

MEMORY STATE WHEN PROCESS A IS CREATED

MEMORY STATE WHEN PORTION OF MEM-PO IS MAPPED

INFORMATION PROCESSING APPARATUS IN WHICH PROCESSES CAN REDUCE OVERHEAD OF MEMORY ACCESS AND EFFICIENTLY SHARE MEMORY

BACKGROUND OF THE INVENTION

1. Field of the Invention

The present invention generally relates to an information processing apparatus, and more particularly, to a multifunctional information processing apparatus having a virtual storage system in which plural processes can efficiently share data.

2. Description of the Related Art

An information processing apparatus such as a personal computer and an image forming apparatus can provide various information processing functions to a user by executing one or more software programs each corresponding to a function. In the case of a conventional information processing apparatus, when one or more software programs are executed simultaneously and a plurality of processes are consequently created in parallel, each process separately reserves a memory region.

Especially, an image forming apparatus is an example of such an information processing apparatus. The recent image forming apparatuses include integrated systems of a digital copier, a printer, a scanner, and a facsimile (hereinafter referred to as a multifunctional apparatus). The multifunctional apparatus is provided with a display unit, a printing unit, and an image capture unit in the system, and is further provided with software programs corresponding to the functions of a digital copier, a printer, a scanner, or a facsimile. A user can use the multifunctional apparatus as a digital copier, a printer, a scanner, or a facsimile by switching the software program.

The multifunctional apparatus is provided with separate software programs that cause the system (multifunctional apparatus) to function as a printer, a digital copier, a facsimile, and a scanner. When executed, the separate software programs create processes. The created processes separately reserve memory regions and manage the memory regions independently.

By the way, the software programs executed by the information processing apparatus are usually operated on an operating system (OS), and the OS manages memory regions of the information processing apparatus. An OS that enables the system to execute a plurality of processes simultaneously (multi-processing OS) usually manages the memory region of the system using, for example, virtual addressing in which each process is provided with a different virtual memory space.

The virtual addressing protects data stored in a virtual memory space of a process from accesses from another process using "paging". The paging divides the virtual address space provided to a process and the physical address space of the physical memory into pages each having the same predetermined memory size specific to a processor model. The paging manages the corresponding relationship between the page of the virtual address space and the page of the physical address space, and translates a virtual address into a physical address.

The paging manages the above corresponding relationship using a page table. Each process to which a virtual address space is provided requires a page table.

Since paging requires translation from a virtual address to a physical address for each memory access, the translation needs to be performed by hardware so as not to lower the performance of the system. The translation is usually done by the memory management unit (MMU) of a processor. The architecture of MMUs is different for each processor model.

For example, the MMU of a processor model, if the physical address of a page table (of a process) is set in a control resister, automatically checks the page table. When the process is switched to another, the physical address of the other page table of the other process is set in the control resister.

The MMU of another processor model does not automatically check the page table, but the MMU checks a translation look aside buffer (TLB) that is a translation table provided inside the processor. If there is no entry of the virtual address to which the process accesses in TLB, a TLB exception error occurs. In this case, a software program (handler) searches the page table after the occurrence of the TLB exception error. If necessary, the software program adds an entry to the TLB.

As described above, address management by paging requires hardware to accelerate speed. An address management method called "demand paging", however, inherits the following problems.

When a process is created, no physical memory is allocated to the process, and all the entries of a page table are set invalid. When executed, the process accesses the memory, and a page table exception error occurs. The handler of this page table exception error reserves the physical memory and creates the contents of the page table.

Accordingly, even if the physical memory is still available, the process has to wait for the handler to set the page table (the process suffers from processing overhead). This overhead matters especially in the case of information processing such as image forming that requires a large memory.

The address of the physical memory corresponding to the virtual memory is set up in the page table so that the processor can manage the physical memory flexibly. In this case, however, data stored in a continuous region of the virtual address space may be stored in separate regions of the physical address space. That is, the data stored in the physical address space become discontinuous. Consequently, when the data need to be exchanged between the memory and another element of the system by direct memory access (DMA), the discontinuity of the data degrades the efficiency of data exchange.

Japanese Laid-open Patent Application No. 7-160583 discloses a technique to share the page table. Japanese Laid-open Patent Application No. 6-58649 discloses a technique in which a segment of the virtual memory space is divided into a common region and a proper region. Neither technique, however, can reduce the overhead caused by memory accesses.

MIPS (trade mark) CPU, for example, employs architecture in which physical memory is allocated to the direct mapping regions of all processes using entries of TLB that are fixedly used. In such a case, a process B may erroneously write data in a direct mapping region that only a process A is permitted to access due to a bug in a computer program. The bug may not be easily identifiable, and the causal analysis of the error may take a long time.

The direct mapping region that only the process A is permitted to access is a region that is allocated to the process A using function (of MEM-P0) for allocating the direct mapping region only to the process A using a system call.

When the process B writes data in this region, the process B ends abnormally. According to this arrangement, the error becomes easy to identify.

Additionally, the use of the direct mapping region brings the following effect. When a page exception occurs, a virtual memory processing unit of the operating system is executed. According to the execution of the virtual memory processing unit of the operating system, when a large memory needs to be accessed, the overhead on the CPU is great. The use of the direct mapping region can eliminate the overhead on the CPU.

SUMMARY OF THE INVENTION

Accordingly, it is a general object of the present invention to provide a novel and useful information processing apparatus, and more particularly, to provide an information processing apparatus that can reduce the overhead incurred due to memory accesses and improve the efficiency of memory management.

Yet another object of the present invention is to provide an information processing apparatus that enables a plurality of processes created by the execution of application programs to share data.

To achieve one of the above objects, an information processing apparatus that maps a virtual memory region of a process over a physical memory space, according to the first aspect of the present invention includes a region reserving unit that reserves, in said physical memory space, a direct mapping region over which said virtual memory region can be directly mapped by said process, and an address translating unit that correlates a physical address of said direct mapping region with a virtual address of said virtual memory region.

Said virtual memory region may be managed by a page of a predetermined size. The information processing apparatus can manage the virtual memory region by the page of the predetermined size. The information processing apparatus can adapt itself to the architecture of an operating system that manages memory by the page, and consequently, can improve the efficiency of memory management.

The information processing apparatus reserves a direct mapping region in the physical memory space and correlates physical addresses of the direct mapping region in the physical memory space with the virtual addresses of the virtual memory region in the virtual memory space of a process. Accordingly, the number of exception errors caused by the address translating unit is reduced, and the processing overhead of memory accesses is reduced.

The information processing apparatus may include an address updating unit that updates contents of said address translating unit correlating a physical address of said direct mapping region with a virtual address of said virtual memory region without using a virtual memory system.

The contents of the address translating unit correlating the physical address of the direct mapping region with the virtual address in the virtual memory space are updated without using the virtual memory system. Accordingly, the information processing apparatus can reduce the overhead incurred in memory accesses through the virtual memory system, and can use the translating function of virtual addresses provided by the hardware.

Said address updating unit may update, when said process is created, said contents of said address translating unit.

If the contents of the address translating unit are updated in response to activation of each process, the number of exception errors occurring during the performance of each process can be reduced. Accordingly, the overhead incurred in memory accesses to the direct mapping region is reduced.

Said region reserving unit may reserve said direct mapping region when the information processing apparatus is started.

Since the direct mapping region is reserved when the information processing apparatus is started, it is possible to correlate, when each process of the application program is created, the physical address of the direct mapping region with the virtual address in the virtual memory space.

Said address translating unit may be an address translating table correlating, for each process, a physical address of said direct mapping region with a virtual address of said direct mapping region, said address translating unit being provided in a kernel.

Some of processor models automatically search the address translation table in the kernel and translate the virtual address to a physical address. For such processor models, the occurrence of exception errors can be reduced, and as a result, the overhead incurred for the memory accesses to the direct mapping region is reduced.

Said address translating unit may be an address translation table correlating, for each process, a physical address of said direct mapping region with a virtual address of said virtual memory region, said address translating unit being provided in a processor.

In the case of processor models that automatically search the address translation table in the processor and translate the virtual address to a physical address, the occurrence of exception errors can be reduced, and as a result, the overhead incurred for the memory accesses to the direct mapping region is reduced.

Said address translating unit may correlate a physical address of said direct mapping region with a virtual address of said virtual memory region using a portion of said address translation table in which an entry is protected from being overwritten.

Accordingly, the information processing apparatus can prevent the corresponding relationship between the physical address of the direct mapping region and the virtual address in the virtual memory space stored in the address translation table in the processor from being overwritten.

If virtual addresses of said virtual memory region are continuous, said processor may reserve, in said physical memory space, a continuous direct mapping region so that physical addresses of said direct mapping region corresponding to said virtual addresses become continuous.

Accordingly, the information processing apparatus can map a continuous region in the virtual memory region over a continuous region in the direct mapping region. As a result, the exchange of large volume data sets through direct memory access becomes easy.

When a plurality of processes are created, said address translating unit may correlate the virtual memory regions of respective processes with said direct mapping region so that the processes can share said direct mapping region.

Accordingly, since the physical address of the direct mapping region is correlated with the virtual address of the virtual memory region so that the plurality of processes can share the direct mapping region, the processes can share data stored in the direct mapping region in the physical memory space.

The information processing apparatus may be characterized in that a virtual memory space includes a user program region and a stack region that are managed by said virtual memory system, and a region in said virtual memory space left unused and unmanaged by said virtual memory system is mapped over said direct mapping region.

Since a region in the virtual memory space that is not managed by the virtual memory system is mapped over the direct mapping region, the virtual address can be translated to a physical address using the address translation function of the hardware without involving the virtual memory system.

According to another aspect of the present invention, a method of managing a physical memory space provided to an information processing apparatus that maps a virtual memory region of a process over said physical memory space, includes the steps of reserving a direct mapping region in said physical memory space over which said virtual memory region can be directly mapped by said process, and correlating a physical address of said direct mapping region with a virtual address of said virtual memory region.

The direct mapping region is reserved in the physical memory space, and the virtual memory region is mapped to the direct mapping region in the physical memory space. Accordingly, the number of exception errors that occur when a virtual address is translated to a physical address is reduced; the overhead that is incurred when the direct mapping region is accessed can be reduced.

Said virtual memory region may be managed by a page of a predetermined size.

Accordingly, it is possible to manage the virtual memory region by the page of the predetermined size and to adapt to the architecture of an operating system that manages the physical memory space by the page. The efficiency in memory management is improved.

In the step of correlating, a corresponding relationship between said physical address and said virtual address may be updated without using a virtual memory system.

The corresponding relationship between the physical address of the direct mapping region and the virtual address in the virtual memory region can be updated without involving the virtual memory system. Accordingly, it is possible to avoid the overhead caused by the virtual memory system and to use the hardware resource that translates the virtual address to the physical address.

In the step of correlating, said corresponding relationship may be updated when said process is activated.

The corresponding relationship between the physical address of the direct mapping region and the virtual address of the virtual memory region is updated when each process of the application program is created. Accordingly, the exception error that occurs when the virtual address is translated to the physical address is eliminated. The overhead caused by the memory access to the direct mapping region can be reduced.

When said information processing apparatus is started, said direct mapping region may be reserved in the step of reserving.

If the direct mapping region is reserved in the physical memory space when the information processing apparatus is started, the virtual address of the virtual memory region can be mapped, when each process of the application program is created, over the direct memory region.

In the step of correlating, an address translation table of each process, provided in the kernel of the operating system, correlating a physical address of said direct mapping region with a virtual address in said virtual memory region may be updated for each process of the application program.

Accordingly, the processor model that automatically searches an address translation table in the kernel and translates the virtual address to the physical address encounters fewer exception errors. The overhead caused by the memory access to the direct mapping region can be reduced.

In the step of correlating, an address translation table of each process, provided in a processor, correlates a physical address of said direct mapping region with a virtual address in said virtual memory region.

Accordingly, the processor model that automatically searches an address translation table in the processor and translates the virtual address to the physical address encounters fewer exception errors. The overhead caused by the memory access to the direct mapping region can be reduced.

In the step of correlating, said physical address of said direct mapping region may be correlated with said virtual address in said virtual memory region of said process using a portion of said address translation table in which entries are protected from being overwritten.

Accordingly, the corresponding relationship between the physical address of the direct mapping region and the virtual address of the virtual memory region stored in the address translation table in the processor is not overwritten.

In the step of correlating, if virtual addresses of said virtual memory region are continuous, a continuous direct mapping region may be correlated with said virtual memory region so that the physical addresses of said direct mapping region corresponding to said virtual addresses become continuous.

Accordingly, a continuous virtual memory region can be mapped over a continuous portion in the direct mapping region. The exchange of large data sets with a device through direct memory access becomes easy.

When a plurality of processes are created, said address translating unit may correlate a physical address of said direct mapping region with the virtual addresses of the virtual memory regions of the processes so that the processes can share data stored in said direct mapping region.

Accordingly, since the virtual address of the virtual memory region is correlated with the physical address of the direct mapping region so that a plurality of processes can share the direct mapping region, the processes can share data stored therein.

The method may be characterized in that a virtual memory space includes a user program region and a stack region that are managed by said virtual memory system, and a region in said virtual memory space left unused and unmanaged by said virtual memory system is mapped over said direct mapping region.

Accordingly, because the unused region in the virtual memory region that is not managed by the virtual memory system is mapped over the direct mapping region, the virtual address can be translated to a physical address by using the address translation function of the hardware without involving the virtual memory system.

According to yet another aspect of the present invention, an information processing apparatus that maps a virtual memory region of a process over a physical memory space, includes a reserving unit that reserves, in said physical memory space, a direct mapping region over which said virtual memory region can be directly mapped, and a mapping unit that directly maps said virtual memory region over a physical memory region in said direct mapping region, said physical memory region being identified by said process by a physical address of said physical memory space.

The process can directly map the virtual memory region over the direct mapping region without involving the virtual memory system by calling the "sysarch" function as the system call.

Said mapping unit may directly activate, through a system call, a mapping processing unit of an operating system that maps said virtual memory region of said process over said physical memory region in said direct mapping region.

The process can directly map the virtual memory region over the direct mapping region by directly activating the mapping processing unit of the operating system through the system call.

Said system call may be provided as the "sysarch" function.

The process can directly map the virtual memory region over the direct mapping region without involving the operating system by calling the "sysarch" function as the system call.

A plurality of processes may share said physical memory region by mapping respective virtual memory regions of said plurality of processes over said physical memory region.

Different processes can share the direct mapping region by designating the same physical address.

Said process may designate said physical address as an offset value indicating said physical memory region in said direct mapping region.

According to yet another aspect of the present invention, an information processing apparatus that maps a virtual memory region of a process over a physical memory space, includes a first reserving unit that reserves, in said physical memory space, a first direct mapping region over which said virtual memory region can be directly mapped, said first direct mapping region being directly accessible by a processor, and a first mapping unit that directly maps said virtual memory region over a first physical memory region in said first direct mapping region by setting, in a page directory entry, a physical address indicating said first physical memory region.

Using the page directory entry, the processor can directly access to the first direct mapping region without involving the operating system.

The information processing apparatus may include a second reserving unit that reserves, in said physical memory space, a second direct mapping region over which said virtual memory region can be directly mapped, and a second mapping unit that directly maps said virtual memory region over a second physical memory region in said second direct mapping region by setting, in a page table entry, a physical address indicating said second physical memory region through a system call of said process.

The process can map the virtual memory region of the process over the second direct mapping region without involving the virtual memory system by setting the physical address indicating the second physical memory region in the page table entry.

Said second mapping unit may directly activate, through a system call, a mapping processing unit of an operating system that maps said virtual memory region of said process over said second physical memory region in said second direct mapping region.

Since the information processing apparatus is designed so that the process can initiate the system call, the process can map the virtual memory region over the second physical memory region without involving the virtual memory system.

Said first mapping unit may map said virtual memory region of said process over said first direct mapping region by a first page size; and said second mapping unit may map said virtual memory region of said process over said second direct mapping region by a second page size.

The first direct mapping region which the processor can access at a high speed and the second direct mapping region over which the process can directly map its virtual memory region through the system call can be managed by the different page sizes, respectively.

To enable the processor to directly access large data sets, said first page size may be larger than said second page size.

The processor can process the large data sets at a high speed.

The information processing apparatus may further include a determining unit that determines, when an operating system is activated, whether said first page size is supported, wherein said first reserving unit, said first mapping unit, said second reserving unit, and said second mapping unit are enabled based on the determination of said determining unit.

The information processing apparatus can be compatible with conventional information processing apparatuses because the information processing apparatus, in the case where the first page size for accessing large data sets is not supported, does not reserve and map the first direct mapping region and the second direct mapping region.

Said physical memory space may be used for image forming.

According to yet another aspect of the present invention, a method of mapping a virtual memory region of a process over a physical memory space, includes the steps of reserving, in said physical memory space, a first direct mapping region over which said process can directly map said virtual memory region, said first direct mapping region being directly accessible by a processor, and directly mapping said virtual memory region over a first physical memory region in said first direct mapping region by setting, in a page directory entry, a physical address indicating said first physical memory region.

Since the physical address of the first physical memory region in the reserved direct mapping region is set in the page directory entry, it is possible to access the first physical memory region based on the page directory entry.

A flag indicating user accessibility may be set in said page directory entry in the step of directly mapping said virtual memory region over said first physical memory region.

Since the flag indicating the user accessibility is set in the page directory entry in which the physical address indicates the first physical memory region in the reserved first direct mapping region, the processor can directly access the first physical memory region without involving the operating system.

The method may further include the steps of reserving, in said physical memory space, a second direct mapping region over which said process can directly map said virtual memory region, and directly mapping, through a system call of said process, said virtual memory region over a second physical memory region in said second direct mapping region reserved in the step of reserving said second direct mapping region by setting, in a page table entry, a physical address indicating said second physical memory region.

Since the physical address of the page is set in the page table managing the entry of pages, the region mapped by a process become accessible by the process. Accordingly, because the same region is also accessible by another process that is mapped by the other process, the process and the other process can share the same region.

A flag indicating user accessibility may be set in said page table entry in the step of directly mapping said virtual memory region over said second physical memory region.

Since the flag indicating user accessibility is set in the page table entry in which the physical address indicates the second physical memory region in the reserved second direct mapping region, the process can directly access the second physical memory region.

Other objects, features, and advantages of the present invention will become more apparent from the following detailed description when read in conjunction with the accompanying drawing.

BRIEF DESCRIPTION OF THE DRAWINGS

FIGS. 20A and 20B are schematic diagrams for explaining a page directory entry and a page table entry.

DETAILED DESCRIPTION OF THE PREFERRED EMBODIMENTS

The preferred embodiments of the present invention will be described in detail by reference to the drawings.

Figure 1:
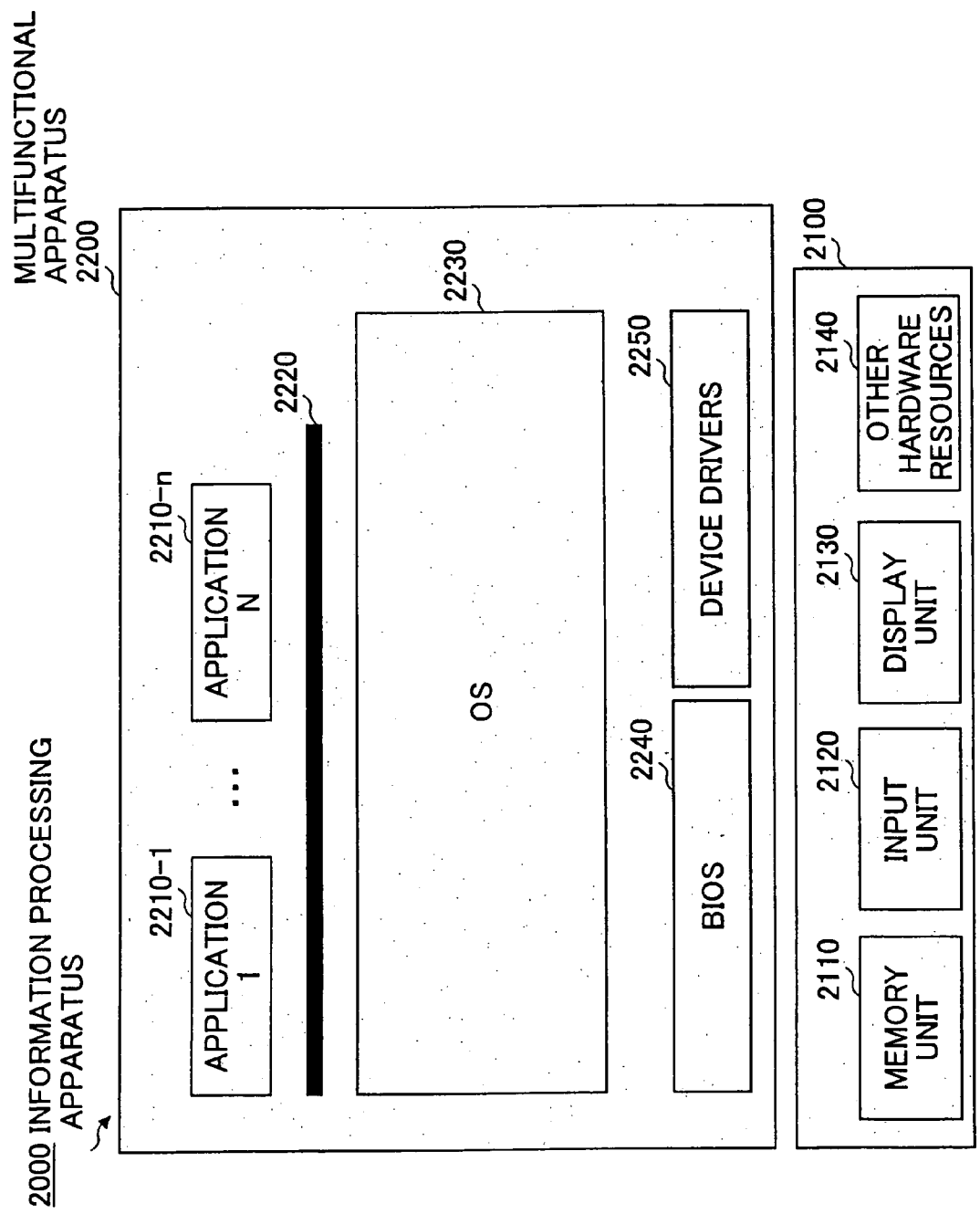
FIG. 1 is a schematic diagram showing an information processing apparatus according to an embodiment of the present invention.

FIG. 1 is a schematic diagram showing an information processing apparatus according to an embodiment of the present invention. The information processing apparatus 2000 includes hardware resources 2100 and software programs 2200.

The hardware resources 2100 include a memory unit 2110, an input unit 2120, a display unit 2130, and other hardware resources 2140. The software programs include application programs 2210-1 through 2210-n, an OS 2230 such as UNIX (trade mark), a BIOS 2240, device drivers 2250. When the power is turned on, the information processing apparatus 2000 retrieves OS 2230 from a secondary storage unit to the memory unit 2110, and executes the OS 2230. When the power is turned on or an instruction is given from an operator, the information processing apparatus 2000 retrieves an application program 2210-1 through 2210-n from the secondary storage unit and copies it to the memory unit 2110, and executes the application program 2210-1 through 2210-n.

The application program 2210-1 through 2210-n causes the information processing apparatus 2000 to perform various information processing operations. BIOS 2240 is a computer program that controls the hardware resources 2100. The device drivers 2250 are computer programs that control the hardware resources 2100 such as a peripheral device, OS 2230 communicates with the application programs 2210-1 through 2210-n through an application program interface (API) 2220. The application 2210-1 through 2210-n calls API 2220 using predefined functions and sends instructions to API 2220.

OS 2230 manages the execution of the application programs 2210-1 through 2210-n as processes in parallel. OS 2230 gives instructions to the hardware resources 2100 through BIOS 2240 and the device drivers 2250.

Figure 3:
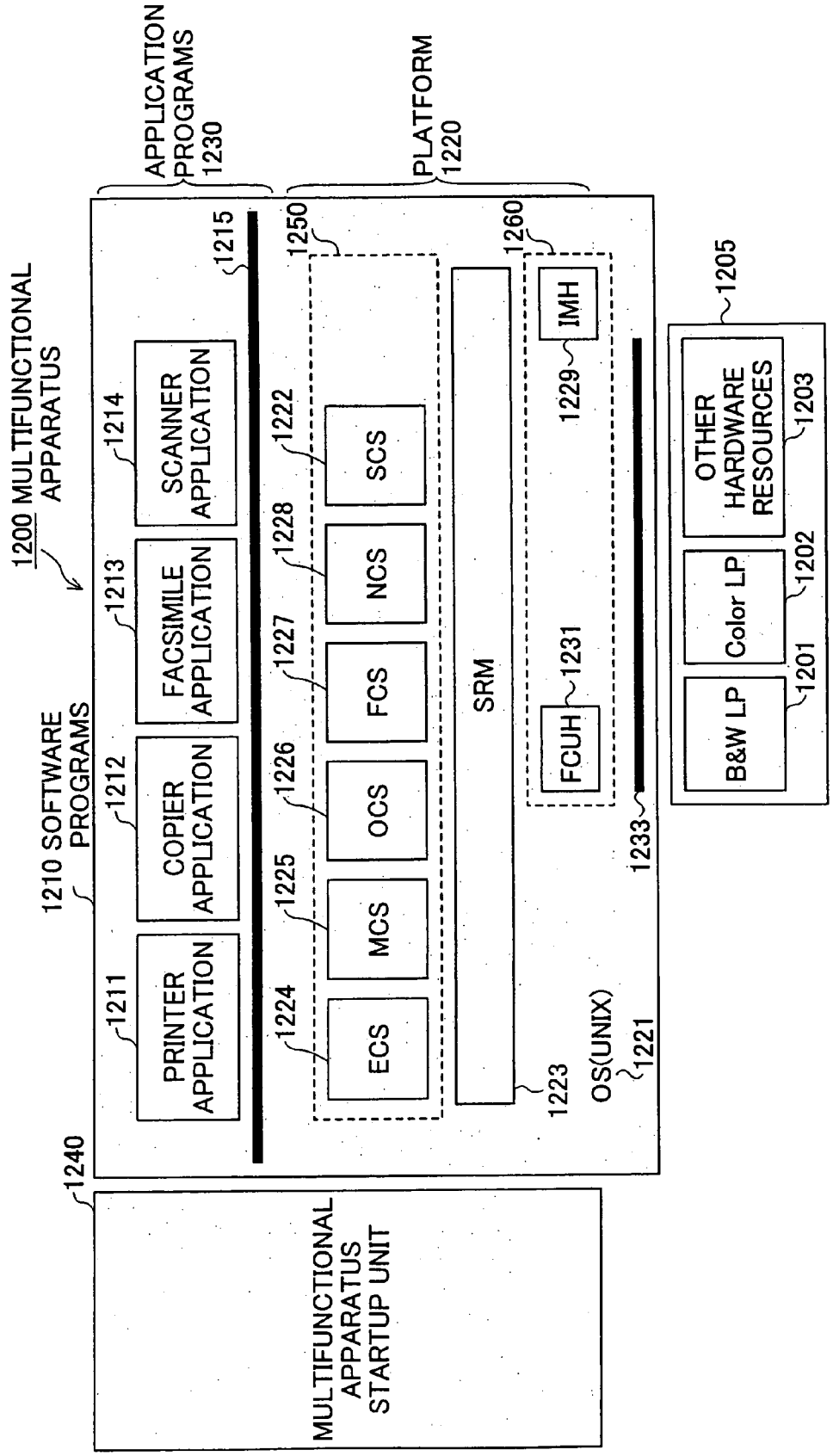
FIG. 3 is a schematic diagram showing a multifunctional apparatus according to an embodiment of the present invention.

The hardware configuration of the information processing apparatus 2000 will be described below. FIG. 3 is a schematic diagram showing the hardware configuration of the information processing apparatus according to an embodiment. The information processing apparatus 2000 is configured by an input unit 2510, a display unit 2520, a secondary storage unit 2530, a memory unit 2540, and a processing unit 2550, all of which are mutually connected via a bus B.

The input unit 2510 includes input devices such as a keyboard and a mouse. An operator can give the information processing apparatus 2000 various instructions by operating the input unit 2510. The display unit 2520 displays various windows and data for the operator. The secondary storage unit 2530 stores therein computer programs and various files and data that are needed for the performance of the computer programs.

The memory unit 2540 stores the computer programs retrieved from the secondary storage unit 2530 when the power of the information processing apparatus is turned on. The processing unit 2550 processes the computer programs stored in the memory unit 2540.

An image forming apparatus will be described below as an example of the information processing apparatus according to an embodiment of the present invention. The image forming apparatus is provided with various functions such as a printer, a copier, a facsimile, and a scanner, and therefore is called a multifunctional apparatus.

FIG. 3 is a schematic diagram showing a multifunctional apparatus 1200 according to the embodiment. The multifunctional apparatus 1200 includes the following: a black & white laser printer 1201, a color laser printer 1202, other hardware resources 1203, a software program group 1210, and a multifunctional apparatus startup unit 1240. A scanner and a facsimile are examples of the other hardware resources 1203. The software program group 1210 further includes an application program group 1230 and a platform group 1220.

The platform group 1220 further includes the following: control services 1250 that interpret requests for processing from the application group 1230 and issue requests to use a hardware resource, a system resource manager (SRM) 1223 that controls at least one hardware resource and arbitrates the requests from the control services 1250, and an operating system (OS) 1221.

The control service 1250 includes at least one service module such as a system control service (SCS) 1222, an engine control service (ECS) 1224, a memory control service (MCS) 1225, an operation panel control service (OCS) 1226, a facsimile control service (FCS) 1227, a network control service (NCS) 1228, and an image memory handler (IMH) 1229.

The platform 1220 has an application program interface (APT) 1215 through which the application 1230 can access the platform 1220 using a predefined function.

The operating system 1221 is UNIX (trade mark), for example. The operating system 1221 executes the software programs of the platform 1220 and the application programs 1230 as processes in parallel.

The processes of SRM 1223 control the system and manage resources together with SCS 1250. The processes of SRM 1223 arbitrate requests from an upper rank layer to use hardware resources such as engines (the scanner unit and printer units, for example), a memory, a hard disk (HDD) file, and host input/output (I/O) (Centronics interface, network interface, IEEE 1394 interface, RS232C interface, for example).

In response to a request from the upper rank layer, SRM 1223 determines whether a hardware resource is in use and, if not, informs the upper rank layer that the hardware resource is available for use. SRM 1223 schedules the use of hardware resources based on the requests from the upper rank layer. SRM 1223 also directly controls the paper transportation and image forming of the printer engine, the securing of memory regions, and the generation of a file.

The processes of SCS 1222 perform application administration, operational unit control, system screen display, LED display, resource administration, interruption application control, and so forth.

The processes of ECS 1224 control the engines of the black & white laser printer 1201, the color laser printer 1202, and the other hardware resource 1203.

The process of MCS 1225 performs the acquisition and discharge of image memory, the storage/retrieval of data to/from a hard disk drive (HDD), and the compression and decompression of image data.

The process of OCS 1226 controls the operation panel that interfaces an operator and the system.

The process of FCS 1227 performs, in response to a request from each application layer of the system controller, facsimile communication through PSTN or ISDN, for example, the registration and reference of various facsimile data, the reading of facsimile, the printing of facsimile in response to a reception, and multifunctional communication.

The process of NCS 1228 provides common services to applications that require communication through a network. The process of NCS 1228 distributes data received from the network to corresponding applications. The process of NCS 1228 transmits data from an application to the network The process of IMH 1229 assigns memory to each process, controls the memory assigned to each process, and controls a direct mapping region that will be described in detail later.

The application 1230 provides users with various user services such as those of a printer, a copier, a facsimile, and a scanner.

The application 1230 includes the following: a printer application 1211 that can use page description languages (PDL, PCL) such as postscript (PS) (trade mark), a copier application 1212, a facsimile application 1213, and a scanner application 1214.

Figure 4:
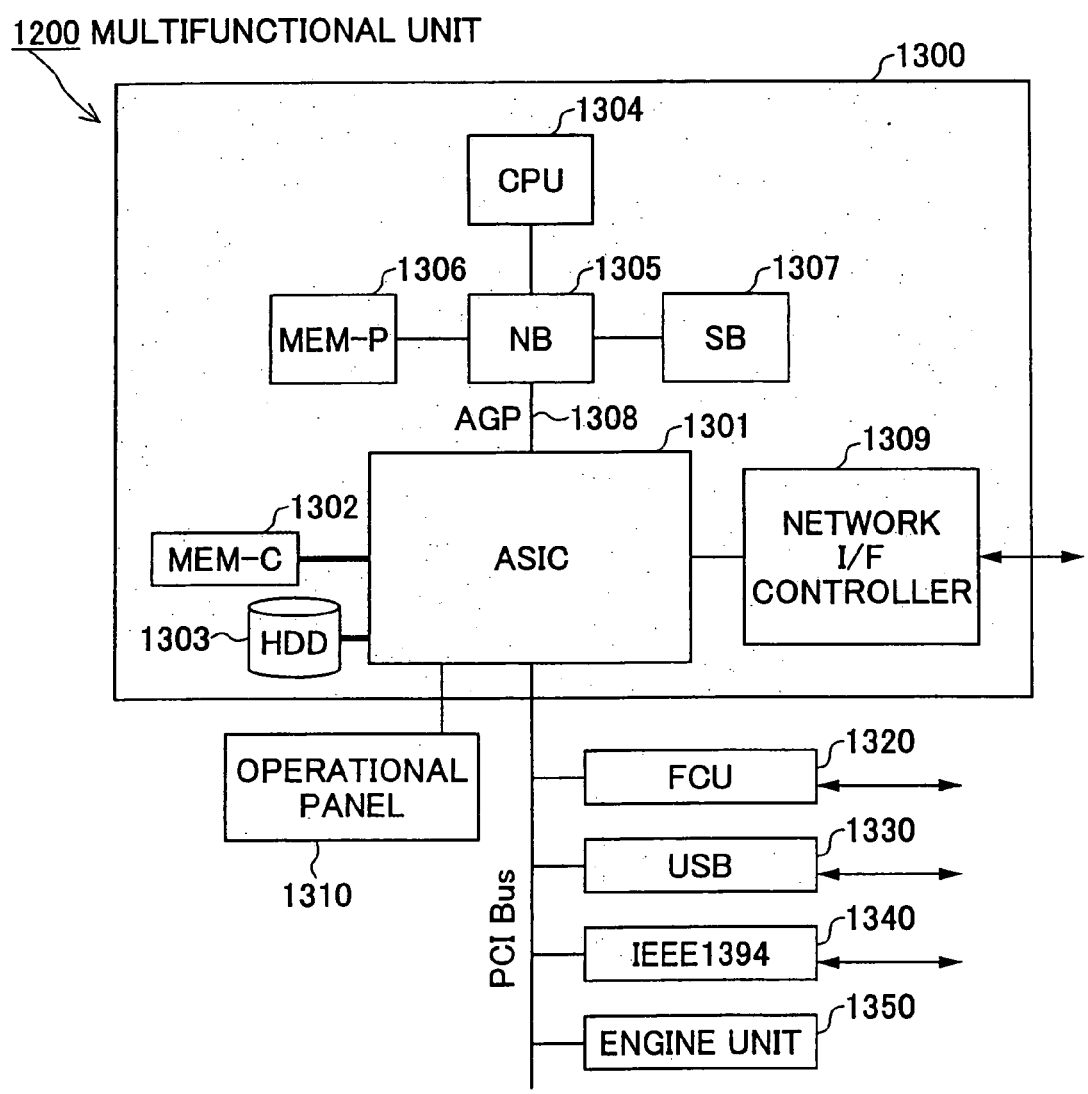
FIG. 4 is a schematic diagram showing the hardware configuration of the multifunctional apparatus of FIG. 3.
Figure 5:
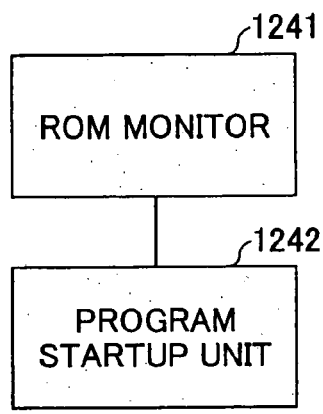
FIG. 5 is a schematic diagram showing a multifunctional apparatus startup unit according to an embodiment of the present invention.

FIG. 4 is a schematic diagram showing the hardware configuration of a multifunctional apparatus according to the embodiment. The multifunctional apparatus 1200 of FIG. 5 is provided with the following: a controller 1300, an operation panel 1310, a facsimile control unit (FCU) 1320, a USB interface 1330, an IEEE 1394 interface 1340, and an engine unit 1350.

The controller 1300 is further provided with a CPU 1304, MEM-P 1306, a north bridge (NB) 1305, a south bridge (SB) 1307, ASIC 1301, MEM-C 1302, and an HDD 1303.

The operation panel 1310 is directly connected to ASIC 1301 of the controller 1300. FCU 1320, USB 1330, IEEE1394 1340, and the engine unit 1350 are connected to ASIC 1301 of the controller 1300 through a PCI bus, for example.

MEM-C 1302 and HDD 1303 are connected to ASIC 1301. CPU 1304 and ASIC 1301 are connected each other through NB 1305 that is a CPU chip set. As described above, even if the information of the interface of CPU 1304 is not available, ASIC 1301 can be connected to CPU 1304 through NB 1305.

ASIC 1301 and NB 1305 are mutually connected through accelerated graphics port (AGP) 1308, instead of the PCI bus. Since data exchange through AGP 1308 is much faster than through the PCI bus, processes of the platform 1220 and the application 1230 can be performed at a high performance rate.

CPU 1304 controls the entire operation of the multifunctional apparatus 1200. CPU 1304 performs SCS 1222, SRM 1223, ECS 1224, MCS 1225, OCS 1226, FCS 1227, NCS 1228, and IMH 1229, which are included in the platform 1220, as processes on the OS 1221. CPU 1304 further performs the printer application 1211, the copier application 1212 the facsimile application 1213, and the scanner application 1214, which are included in the application 1230. In addition, CPU 1304 can automatically look up a page table.

NB 1305 is a bridge to connect CPU 1304, MEM-P 1306, and SB 1307 to ASIC 1301. MEM-P 1302 is used to store image data of the multifunctional apparatus 1200. SB 1307 is a bridge to connect NB 1305, ROM, the PCI bus, and peripheral devices.

MEM-C 1302 is a local memory to be used as an image buffer for the copier and a code buffer.

ASIC 1301 is an integrated circuit provided with hardware elements for image processing. HDD 1303 is a storage device that stores image data, programs, font data, and forms. The operation panel 1310 is an input device with which the operator can operate the multifunctional apparatus 1200, and at the same time, is an output device through which the system displays information to the operator.

Figure 6:
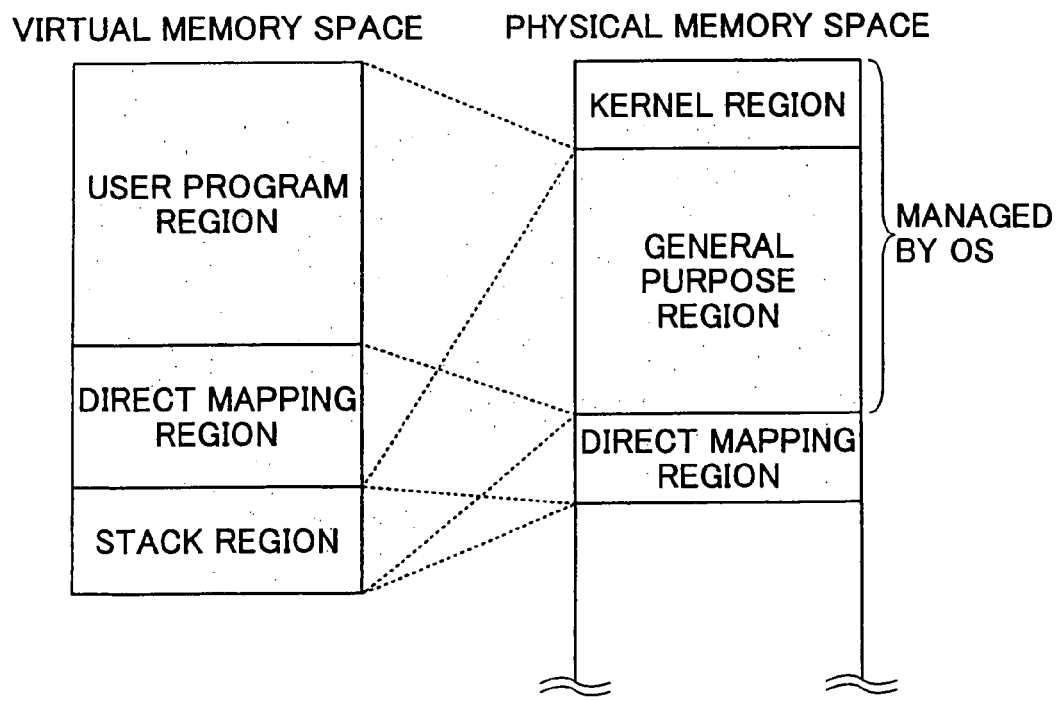
FIG. 6 is a schematic diagram for explaining the memory management of the multifunctional apparatus according to an embodiment.

When the multifunctional unit 1200 is switched on, the startup unit 1240 of FIG. 4 is started first, and starts the platform 1220 and the application 1230. FIG. 6 is a schematic diagram showing the configuration of the startup unit according to the embodiment. The startup unit 1240 is provided with a ROM monitor 1241 and a program startup unit 1242.

When the power is switched on, the ROM monitor 1241 is activated, and initializes the hardware, diagnoses a controller board, initializes the software program, and activates the OS 1221, for example. The program startup unit 1242 is called by the OS 1221 and reserves memory regions in MEM-P 1306 and HEM-C 1302. The program startup unit 1240 further retrieves programs of the control service 1250 and the application 1230 from ROM and transfers the retrieved programs to the memory regions reserved in MEM-P 1306 and MEM-C 1302 to activate them.

A description of the memory control of the multifunctional apparatus 1200 will be described below. FIG. 6 is a schematic diagram for explaining the memory management of the multifunctional apparatus 1200. The memory map of MEM-P 1306 and MEM-C 1302 is showed as physical memory space.

In the memory map of the physical memory space of FIG. 6, the kernel region is a memory region that is used by the OS 1221. The general-purpose region is a memory region that is used by various applications 1230 and various control services 1250. The direct mapping region will be described in detail later. The kernel region and the general purpose region are managed by the OS 1221.

The memory map of virtual memory space is also showed in FIG. 6. A user program region, a direct mapping region to be described in detail later, and a stack region are provided in the virtual memory space. A virtual memory region in the virtual memory space is assigned to each process of the application 1230 and each process of the control service 1250.

The user program region and the stack region are managed by a virtual memory system. Accordingly, the contents of the page table corresponding to the user program region and the stack region are generated or revised by the virtual memory system.

Figure 7:
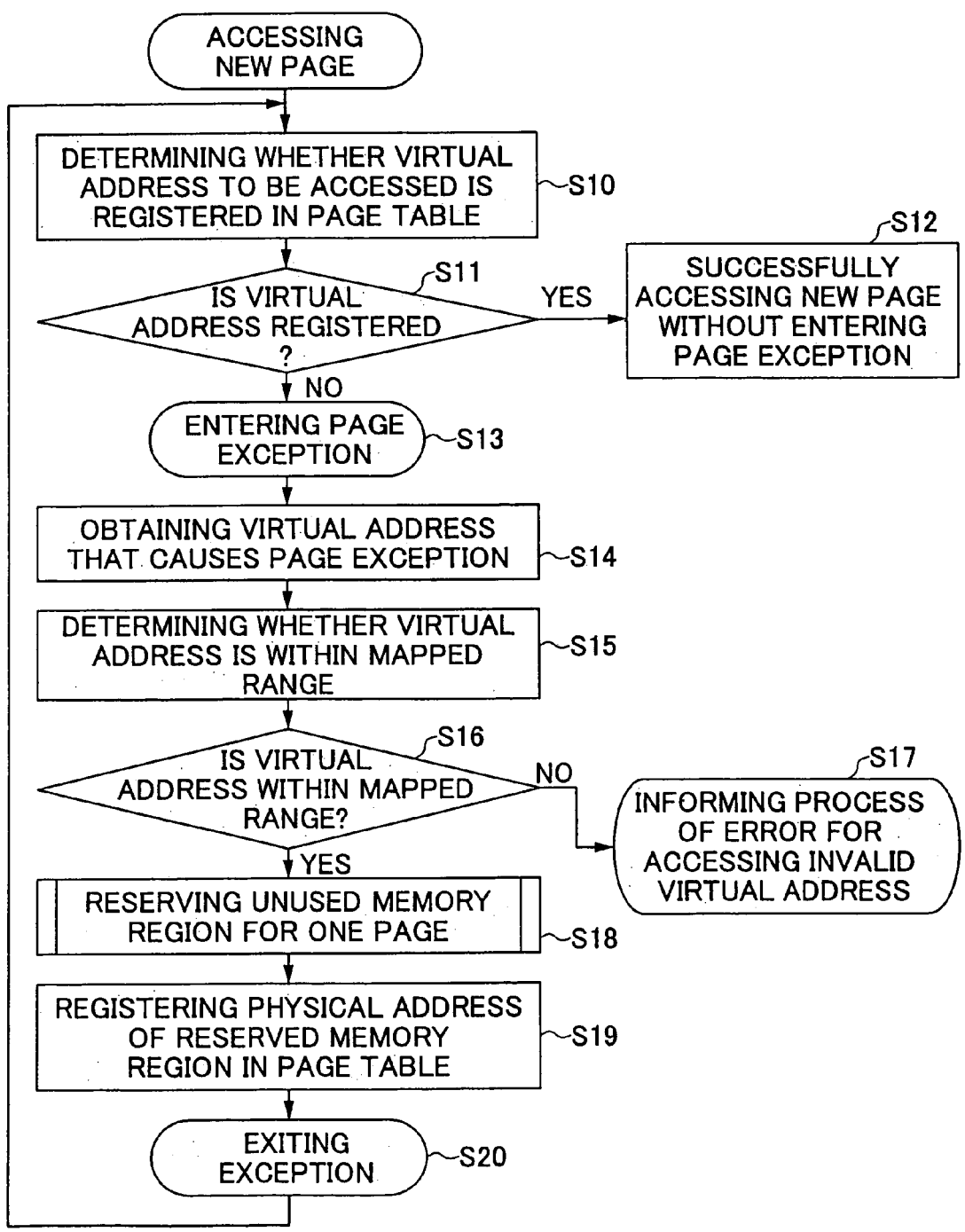
FIG. 7 is a flow chart of a method of accessing a page.

By reference to FIG. 7, a page access operation for the case where the contents of the page table are invalid will be described. FIG. 7 is a flow chart showing a page access operation.

When CPU 1304 needs to access a new page, CPU 1304 determines whether the virtual address of the new page to be accessed is registered in the page table (step S10). If the contents of the page table are invalid, CPU 1304 determines that the virtual address of the new page to be accessed is not registered in the page table (NO branch of step S11), and performs step S13.

Since CPU 1304 determines that the virtual address of the new page to be accessed is not registered in the page table, a page table exception error is issued (step S13). The CPU 1304 obtains the virtual address at which the page table exception error has occurred (step S14).

The virtual memory system determines whether the virtual address obtained in step S14 is within a range of virtual addresses that is mapped to the memory. If the virtual memory system determines that the obtained virtual address is within the range of virtual addresses that is mapped to the memory (YES branch of step S16), the virtual memory system reserves one page of physical memory (step S18), If the virtual memory system determines that the virtual address obtained is not within the range of virtual addresses that is mapped to the memory (NO branch of step S16), the virtual memory system issues an irregular address access error to the process (step S17).

The virtual memory system registers the address of the physical memory reserved in step S18 in the page table (step S19). CPU 1304 returns to step S10 (step S20). CPU 1304 determines whether the virtual address of the new page to be accessed is registered (step S10).

Because the contents of the page table have been created in step S19, CPU 1304 determines that the virtual address of the new page to be accessed is registered in the page table (YES branch of step S11), and goes to step S12. CPU 1304 successfully accesses the new page without issuing a page table exception error. If CPU 1304 accesses the new page in this manner, CPU 1304 wastes time (overhead), even though there remain unused regions in the physical memory space, whenever it accesses a new page that is not registered in the page table.

Accordingly, the multifunctional apparatus 1200 according to the present invention creates a direct mapping region in the virtual memory space and the contents of the page table corresponding to this direct mapping region are created when a process is created or a system call is made during the execution of a user process.

Figure 8:
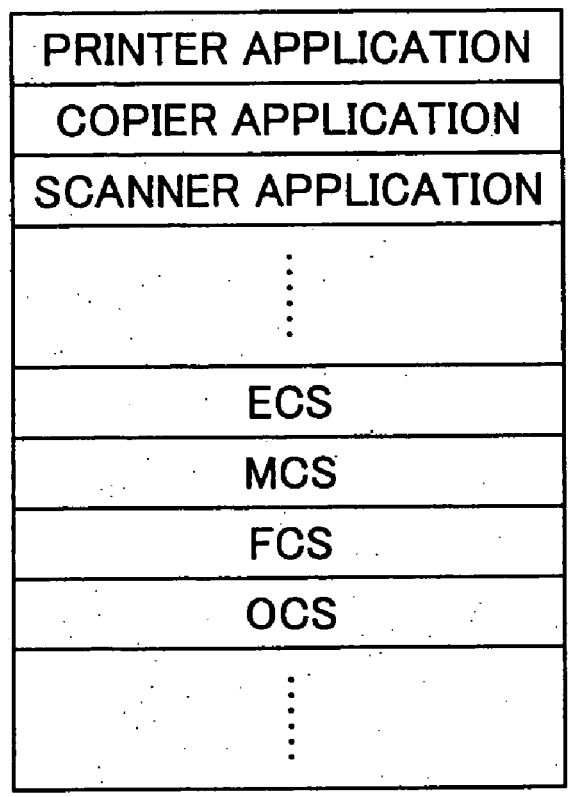
FIG. 8 is a schematic diagram showing the memory map of a direct mapping region.

FIG. 8 is a schematic diagram showing a memory map of the direct mapping region according to the embodiment. As showed in FIG. 8, each portion of the direct mapping region is assigned to a process of an application 1230 such as the printer application 1211 and the copier application 1212, and a control service 1250 such as ECS 1224 and MCS 1225.

According to the embodiment of the present invention, when the virtual memory system is activated, an unused region in the physical memory other than the region that is used for the virtual memory region is reserved as the direct mapping region. Accordingly, the contents of the page table corresponding to the direct mapping region are not created or modified by the virtual memory system.

Figure 9:
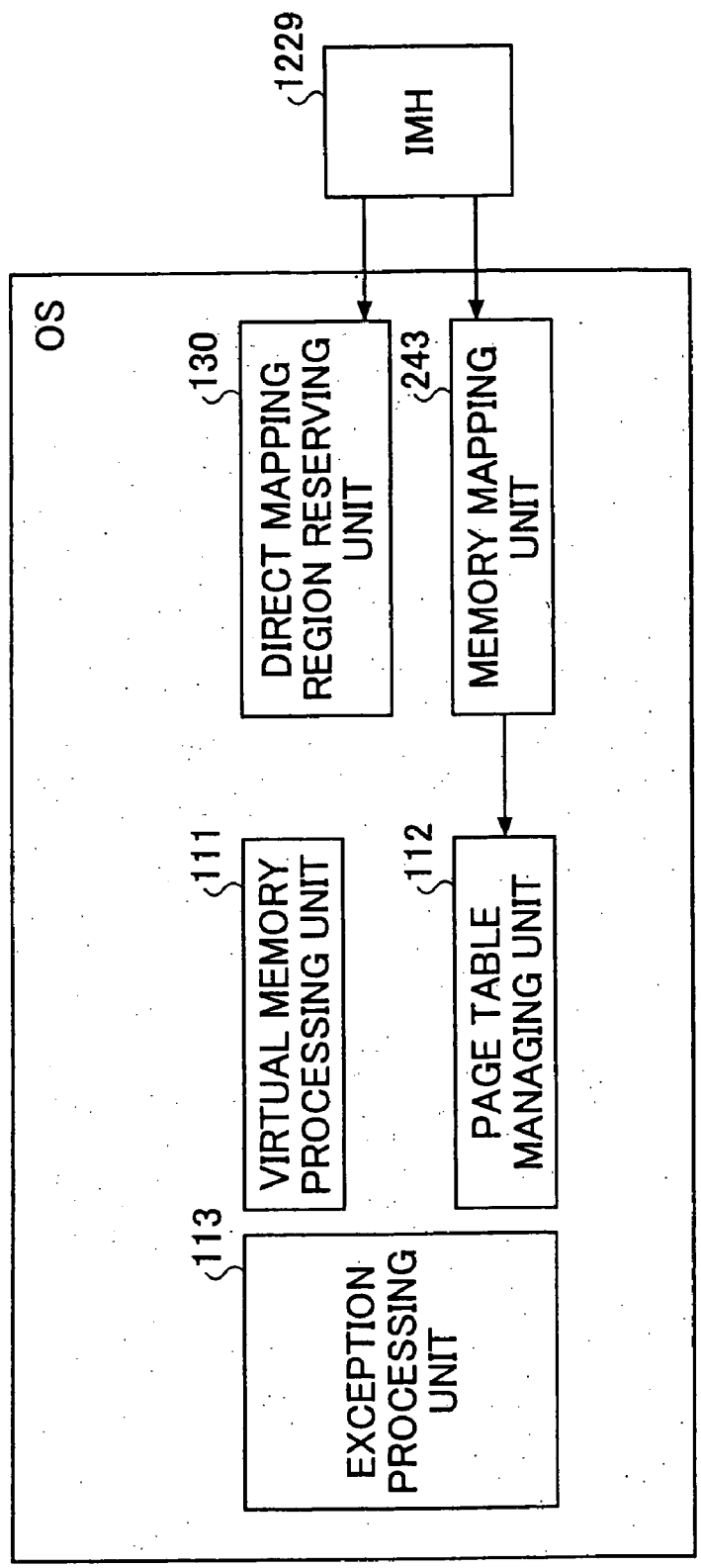
FIG. 9 is a schematic diagram for explaining a method of managing the direct memory mapping region according to an embodiment.

FIG. 9 is a schematic diagram for explaining a method for managing memory in the direct mapping region. In FIG. 9, elements that are irrelevant to the explanation are not shown.

The OS includes the following: a virtual memory processing unit 111 that handles accesses to the virtual memory, a page table managing unit 112 that manages memory regions in the virtual memory by the page using page tables, and an exception processing unit 113 that handles exceptions caused by accesses to the virtual memory. The virtual memory processing unit 111, the page table managing unit 112, and the exception processing unit 113 constitute the virtual memory system.

When the virtual memory system is activated, a direct mapping region reserving unit 130 sets up a virtual address for the direct mapping region in the virtual memory space corresponding to the direct mapping region in the physical memory space.

When a process is created or a system call is made during the execution of a user process, the memory mapping unit 243 maps a virtual memory region of the process to the direct mapping region in response to an instruction from IMH 1229. In other words, the memory mapping unit 243 updates the contents of the page table managed by the page table managing unit 112 so that the physical address of the direct mapping region corresponds to the virtual (logical) address for the direct mapping region of the virtual memory space.

In addition, the direct mapping region reserving unit 130 corresponds to a region reserving unit in the claims. The page table managing unit 112 corresponds to an address translating unit described in the claims. The memory mapping unit 243 corresponds to an address updating unit in the claims.

By reference to FIG. 7, a description of the access to a page of the direct mapping region will be described below. When the page included in the direct mapping region is to be accessed, CPU 1304 determines whether the virtual address of the page to be accessed is registered in the page table (step S10).

The contents of the page table corresponding to the direct mapping region have been created when the process is created or a system call is made during the execution of a user process. CPU 1304 determines that the virtual address of the page to be accessed is registered in the page table (YES branch of step S11) and goes to the next step S12. CPU 1304 does not need to issue a page table exception error, but successfully accesses the page included in the direct mapping region (step S12).

Shortly, when a processor having a function of automatically looking up the page table accesses a page included in the direct mapping region, the processor does not need to issue a page table exception error. The processor successfully looks up the page table automatically and translates the virtual address into a physical address.

Accordingly, the virtual memory system does not recognize that the direct mapping region is accessed and does not manage the virtual memory region. When the page is accessed as described above, the processor can access the page without incurring overhead of the virtual memory system.

The first embodiment of the present invention uses user address space between the user program region and the stack region of the virtual memory space that is not used by the virtual memory system as the direct mapping region. Because the user address space included in the virtual memory space is usually larger than the address space that is actually used, the user address space that the virtual memory system is not using may be used as the direct mapping region.

[Second Embodiment]

A description of the second embodiment will be given below. In this embodiment, a processor that does not have the function of automatically looking up the page table but uses the translation look aside buffer (TLB) to translate an address is used. The software configuration and the hardware configuration of the multifunctional apparatus 1200 according to the first embodiment are identical to those of the multifunctional apparatus 1200 according to the second embodiment. The configuration of the startup unit 1240 according to the first embodiment is also identical to that of the second embodiment. Accordingly their descriptions are omitted.

CPU 1304 has and manages TLB in its cache memory. The virtual (logical) addresses and the physical addresses corresponding to each other are stored in TLB. When a process designates a virtual (logical) address to access the memory, TLB translates the designated virtual (logical) address into a corresponding physical address. TLB stores therein a predetermined number (48 and 64, for example) of pairs of the virtual (logical) addresses and the physical addresses.

Figure 10:
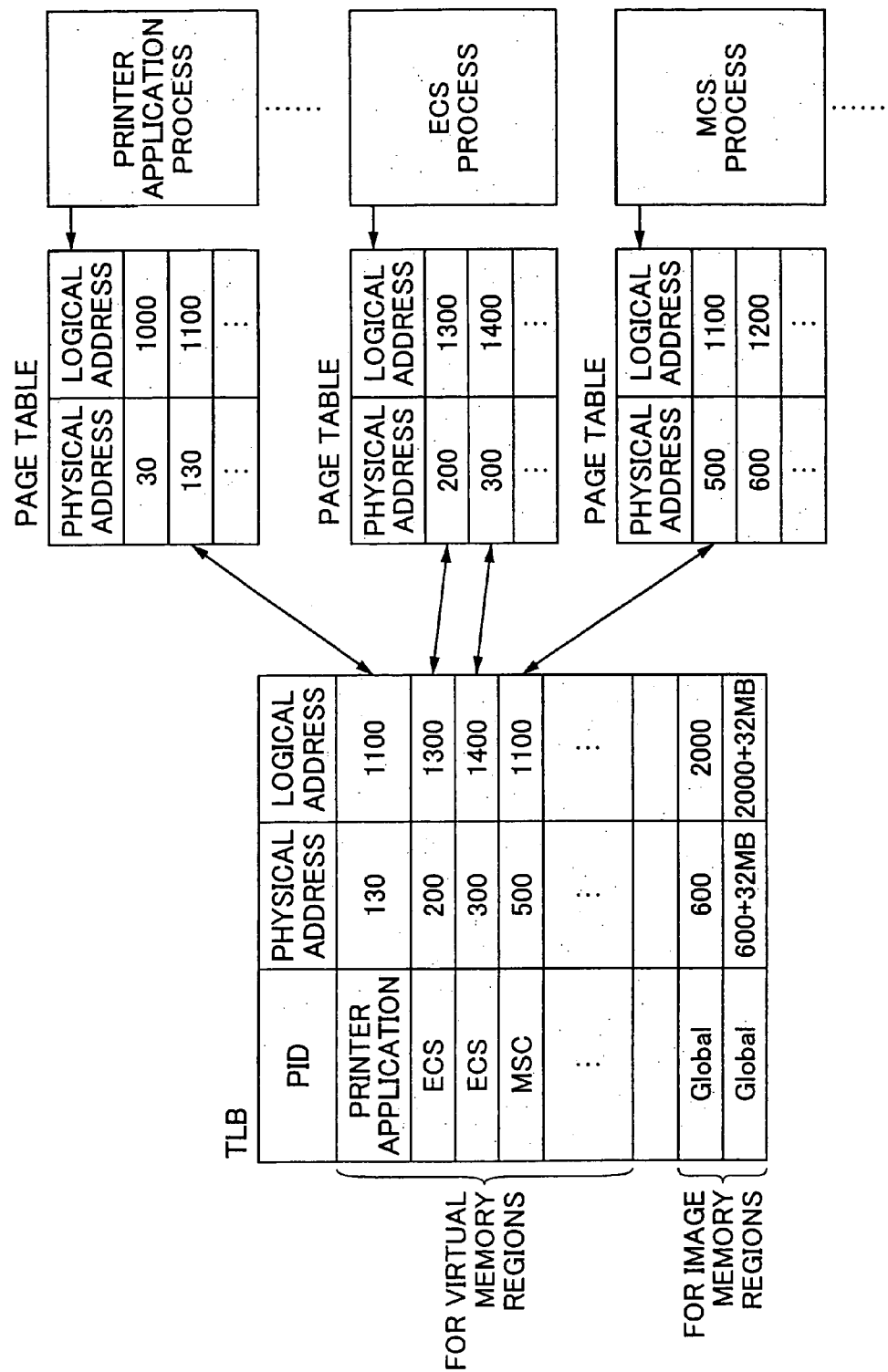
FIG. 10 is a schematic diagram for explaining the relationship between a TLB and a page table of each process.

FIG. 10 is a schematic diagram for explaining the relationship between TLB and the page table of each process. As showed in FIG. 10, each page table uses its own virtual (logical) addresses and physical addresses corresponding thereto. TLB further holds, for each process ID (PID), the virtual (logical) addresses that each process accesses and the physical addresses corresponding to the virtual (logical) addresses.

When a process of the printer application 1211 accesses a virtual (logical) address 1100, for example, CPU 1304 searches the virtual (logical) address 1100 from the PID of the printer application 1211 and accesses a physical address 130 corresponding to the virtual (logical) address 1100 of the printer application 1211.

On the other hand, when the process of the printer application 1211 accesses a virtual (logical) address 1000, for example, CPU 1304 searches for the virtual (logical) address 1000 in the PID of the printer application 1211. The virtual (logical) address 1000 of the printer application 1211 is not yet registered in the TLB of FIG. 10. Accordingly, CPU 1304 issues a TLB exception error and looks up the page table of the printer application 1211. CPU 1304 obtains a physical address 30 corresponding to the virtual (logical) address 1000 of the printer application 1211. CPU 1304 adds an entry "PID: printer application, physical address: 30, virtual (logical) address: 1000" to the TLB.

The number of entries that the TLB can store therein, however, is given for each processor type. Because an old entry may be overwritten by a new entry, the processor has a function to protect important entries which CPU 1304 frequently accesses from being overwritten.

Figure 11:
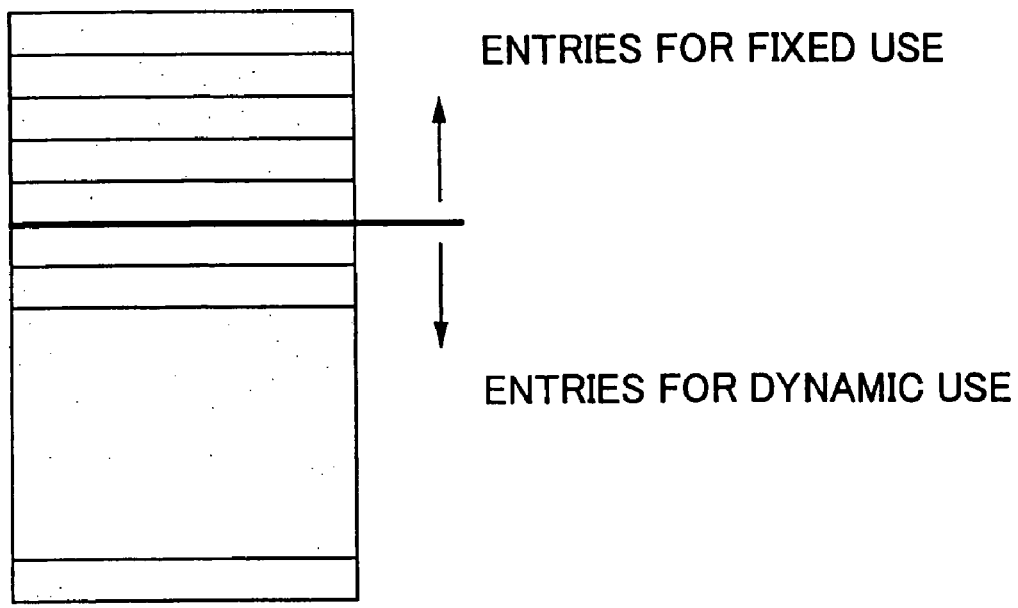
FIG. 11 is a schematic diagram showing a TLB.
Figure 12:
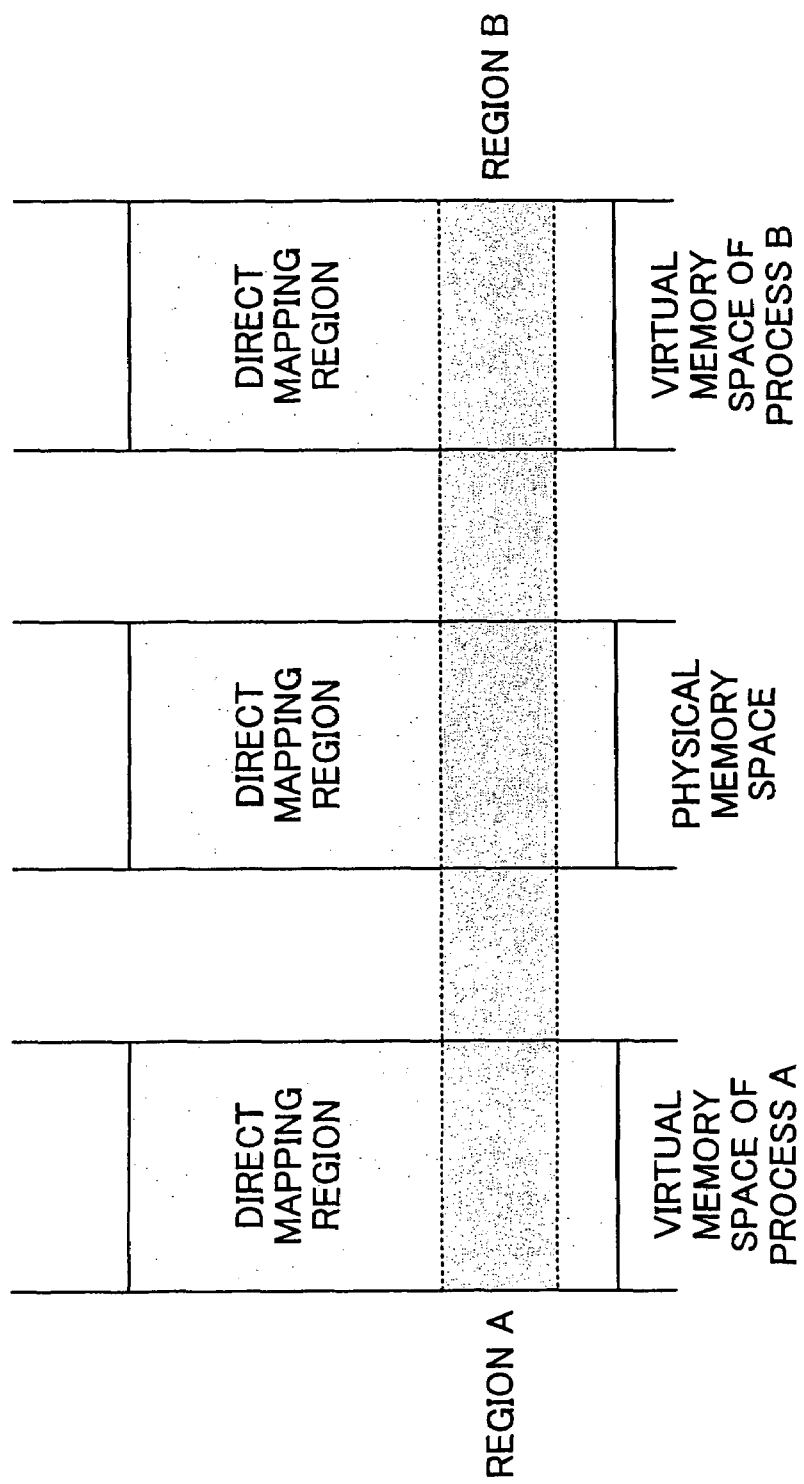
FIG. 12 is a schematic diagram showing a memory map of a memory that is shared by a plurality of processes.

FIG. 11 is a schematic diagram showing the structure of a TLB. The TLB showed in FIG. 12 is divided into two portions. A predetermined number of entries stored in a portion (showed at the upper side in FIG. 11) are not overwritten and always remain in the TLB. The other entries stored in another portion (showed at the lower side in FIG. 11) may be overwritten dynamically. The entries that are accessed frequently are stored in the fixed portion of the TLB and are protected from the overwriting.

Accordingly, in this embodiment, a direct mapping region is created in the virtual memory space in the same manner as the first embodiment. When a process is created or a system call is made during the execution of a user process, the virtual address of the direct mapping region and corresponding physical address are written in the fixed portion of the TLB as an entry.

When the virtual memory system is activated, an unused region of the physical memory other than the portion used for the virtual memory region is reserved as the direct mapping region. Accordingly, the contents of the TLB corresponding to the direct mapping region are not created or modified by the virtual memory system.

In addition, in the case of the second embodiment, the memory mapping unit 243 of FIG. 10 writes an entry in the stationary entry area of the TLB controlled by CPU 1304 so that the physical address of the direct mapping region corresponds to the virtual (logical) address for the direct mapping region in the virtual memory space, When a page included in the direct mapping region is accessed, CPU 1304 can with assurance find the virtual (logical) address and obtain the corresponding physical address. Since no TLB exception error is issued, the virtual memory system does not even recognize that the direct mapping region is accessed. The process can access the page without the inefficiency caused by the virtual memory system.

In the second embodiment, a region of the virtual memory space that is not used by the virtual memory system, the region sandwiched by the user program region and the stack region, is used as the direct mapping region. Because the user address space included in the virtual memory space is large enough compared to address space that is actually used, a portion of the user address space can be used as the direct mapping region.

The range of addresses that an entry can designate is limited. If a range larger than the limit needs to be designated, it is necessary to write a plurality of entries in the fixed portion of TLB.

In the above embodiments, the direct mapping region showed in FIG. 7 is realized by directly using the hardware embedded in the processors. Accordingly, if the page table or TLB is created so that the physical addresses corresponding to the virtual addresses of the direct mapping region become continuous, data stored in a continuous region of the virtual memory space can be stored in a continuous region of the physical memory space.

Data are usually exchanged between the memory and another element of the system in the physical memory space. Thus, in the case where data stored in the virtual memory space are transferred to another element of the system by DMA, it is beneficial that the data are continuously stored in the physical address space to ensure the high-speed data transfer by DMA.

A plurality of processes can share data by sharing a physical memory region. FIG. 12 is a memory map showing a plurality of processes sharing a memory region.

In the memory maps showed in FIG. 12, a region "a" included in the virtual memory space of a process A and a region "b" included in the virtual memory space of a process B can use the same physical memory region because the contents of the page table or TLB corresponding to the region "a" and the region "b" are modified accordingly. The process A and the process B can consequently share the physical memory region without time loss.

Figure 13:
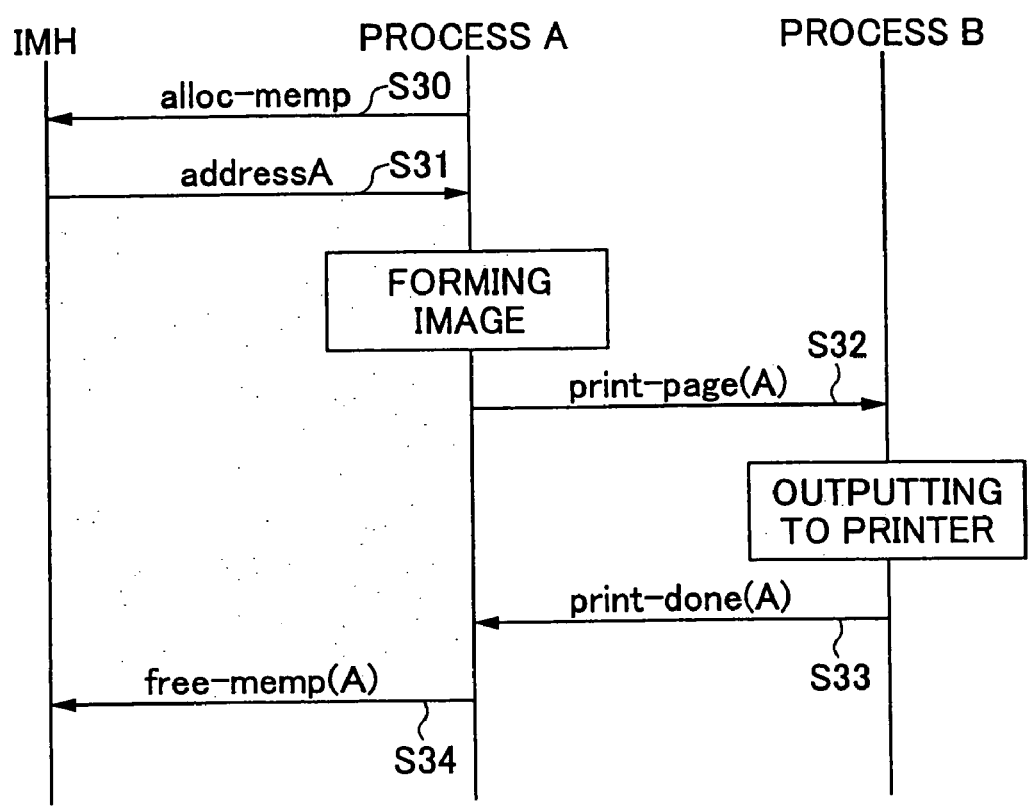
FIG. 13 is a schematic diagram showing a sequence in which memory is shared by a plurality of processes.

By reference to FIG. 13, the sharing of the physical memory by a plurality of processes will be described below. FIG. 13 is a sequence diagram showing the sharing of memory by a plurality of processes.

In FIG. 13, the process A requests IMH 1229 to allocate a physical address (step S30). In response to the request from the process A, IMH 1229 allocates a physical address and informs the process A of the allocated physical address (step S31). For example, the process A creates an image and stores the image at the allocated physical address.

The process A informs the process B of the physical address in which the image is stored via an inter-process communication (step S32). The contents of the page tables or TLB corresponding to the region "a" are included in the virtual memory of the process "A" and the region "b" are included in the virtual memory of the process "B" so that the region "a" and the region "b" are mapped to the same physical memory region.

Accordingly, the process B retrieves the image from the physical address given by the process A. The process B outputs the retrieved image to the printer, for example.

The process B informs the process A, via the inter-process communication, that the image created by the process A has been printed (step S33). In response to the information, the process A requests IMH 1229 to discharge the physical address (step S34).

In the above description of embodiments, the multifunctional apparatus 1200 is mainly described. Those skilled in the art, however, can recognize that the present invention is easily applicable to the information processing apparatus 2000 showed in FIG. 1.

In the case of the information processing apparatus 2000, IMH 1229 may be replaced by the application programs 2210-1 through 2210-n. The application programs 2210-1 through 2210-n and the other computer programs give instructions to the memory mapping unit 243 when they are activated.

In summary, since few exception errors occur when a memory unit is accessed, the information processing apparatus according to the present invention can reduce time required to access the direct mapping region.

According to the present invention, it is possible to allocate the region for the direct mapping region of which virtual (logical) addresses are continuous to continuous physical addresses in the direct mapping region. Accordingly, data can be easily exchanged with another device using the direct memory access method. Efficiency in the DMA data transfer enables the information processing apparatus according to the present invention to handle large data sets.

According to the present invention, the physical addresses in the direct mapping region may correspond to the virtual (logical) addresses for the direct mapping region in the virtual memory space so that a plurality of processes can share the direct mapping region. Accordingly, the plurality of processes can share memory.

The method of mapping memory according to the present invention will be described using an image forming apparatus as an example of the information processing apparatus according to the present invention. In the case of the multifunctional apparatus 1200 in which the platform 1220 and the applications 1230 are constructed on an OS 1221 such as UNIX, the virtual address region is managed in the virtual memory space that the kernel of the OS 1221 can interpret and the virtual memory space that the process created by software can interpret.

Accordingly, while the OS 1221 manages the access to the virtual memory space (hereinafter referred to as the virtual memory space for the kernel), it is necessary to manage the access to the virtual memory space of processes created by the software programs (hereinafter referred to as virtual memory space for each process). When the OS 1221 accesses the virtual memory space for each process from the virtual memory space for the kernel, the virtual address is translated to one which the OS 1221 can access.

Figure 14:
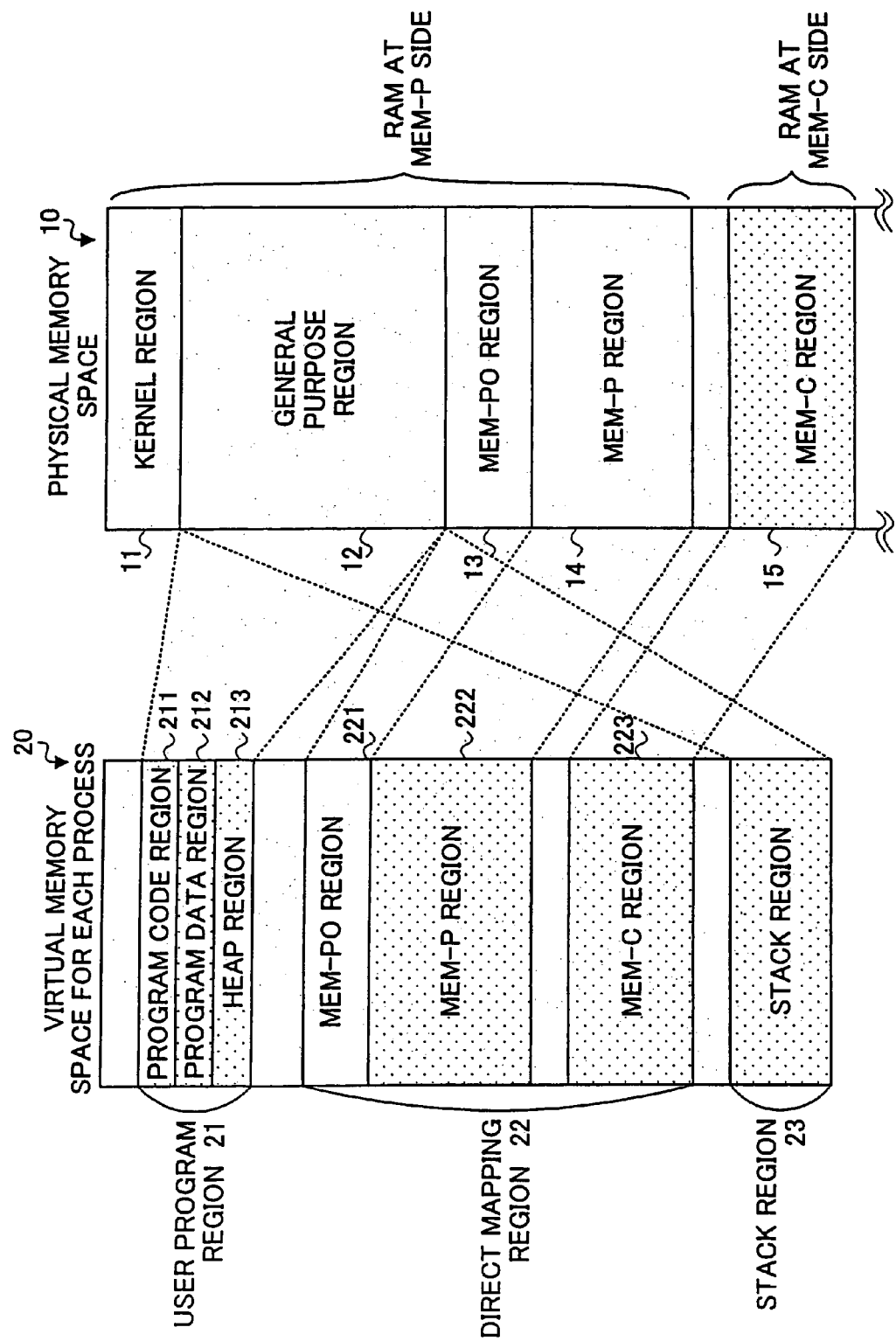
FIG. 14 is a schematic diagram showing the corresponding relationship between the physical memory space and the virtual memory space.

The correspondence between the physical memory space and the virtual memory space, the physical memory space consisting of MEM-C 1302, MEM-P 1306, and HDD 1303, will be described by reference to FIG. 14. The physical memory space 10 includes the following: a kernel region 11, a general purpose region 12, MEM-P0 region 13, MEM-P region 14, and MEM-C region 15. The kernel region 11 is used by the kernel. The general purpose region 12 is managed by the virtual memory processing unit 111 for general purposes. MEM-P0 region 13 is a part of MEM-P 1306, and is mapped to the virtual memory space from the process created by the application 1230 or the control service 1250. MEM-P region 14 is substantially MEM-P 1306 that is accessed by CPU 1304 at a high speed. MEM-C region 15 is substantially MEM-C 1302 which the black & white laser printer (B&W LP) 1201, the color laser printer (Color LP) 1202, and the other hardware resource 1203 can access via the engine interface (I/F) 1233 at a high speed. The regions 11–14 use RAM at the side of MEM-P 1306. The region 15 uses RAM at the side of MEM-C 1302.

The virtual memory space 20 corresponding to the physical memory space 10 includes the following: a user program region 21, a direct mapping region 22, and a stack region 23. The user program region 21 is managed by a virtual memory system (general purpose processing unit 110 to be described later) for general purpose. The direct mapping region 22 is directly accessible from the virtual memory space 20 of a process. The stack region 23 is controlled by the virtual memory system (general purpose processing unit 110) and stacks data when necessary. The user program region 21 further includes the following: a program code region 211, a program data region 212, and a heap region 213. The program code region 211 stores program code of the application 1230 for the execution by CPU 1304. The program data region 212 stores program data required when CPU 1304 executes the application 1230. The heap region 213 dynamically allocates the data region. The user program region 21 is mapped to the general purpose region 12 of the physical memory space 10. The stack region 23 is also mapped to the general purpose region 12 of the physical memory space 10.

The direct mapping region 22 corresponds to a portion of MEM-P 1306 and MEM-C 1302. The direct mapping region 22 is not managed by the virtual memory system (general purpose processing unit 110 to be described later), but is managed by a direct mapping region access driver 120 (to be described later). The direct mapping region 22 includes MEM-P0 region 221, MEM-P region 222, and MEM-C region 223 corresponding to MEM-P0 region 13, MEM-P region 14, and MEM-C region 15, respectively, of the physical memory space 10.

Figure 15:
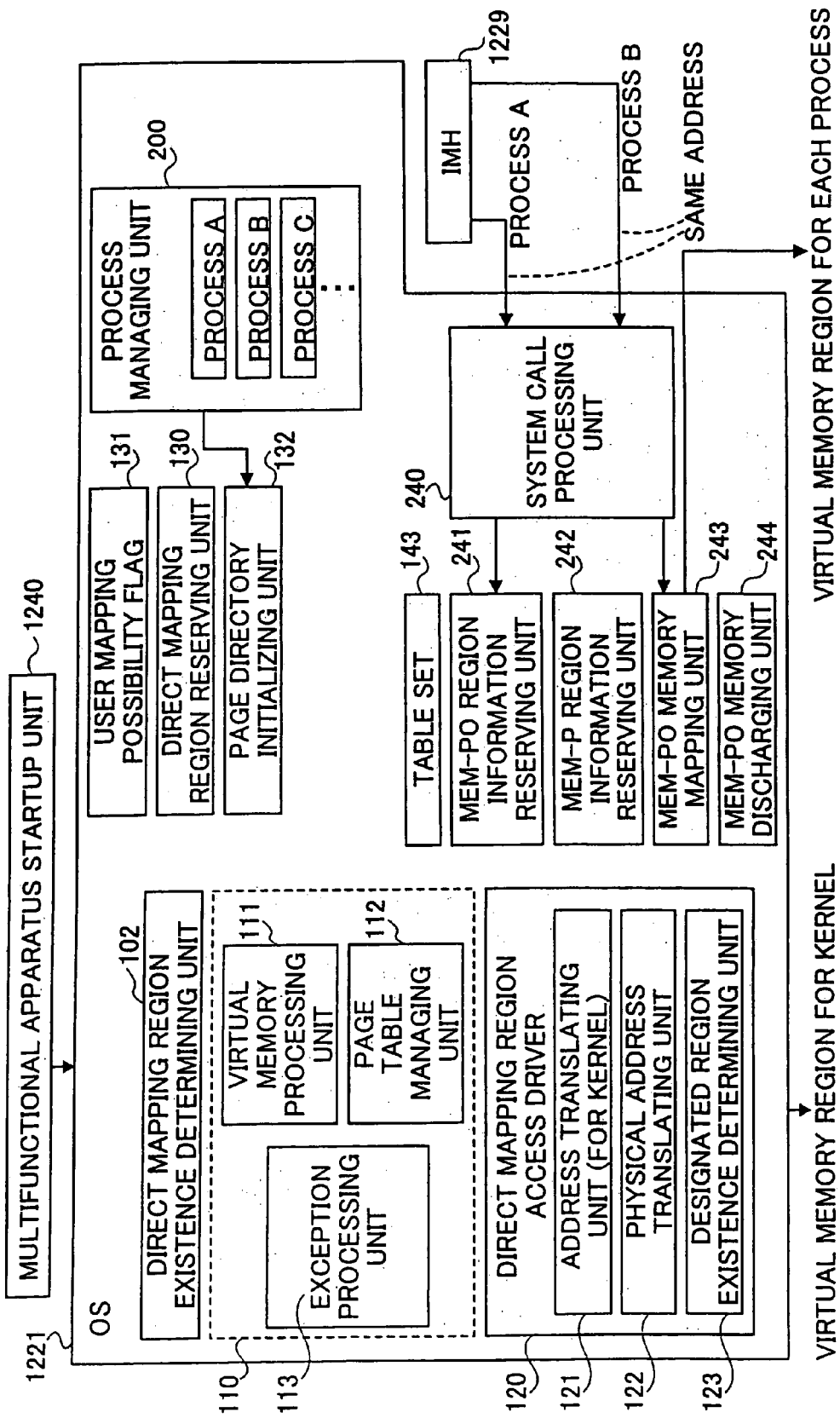
FIG. 15 is a schematic diagram showing the functional configuration of an image forming apparatus according to an embodiment.

The memory management of the direct mapping region will be described below. FIG. 15 is a schematic diagram showing the functional configuration that realizes memory sharing among processes. As showed in FIG. 15, the operating system (OS) 1221 includes the following: direct mapping region reserving unit 130, user mapping possibility flag 131, page directory initializing unit 132, table set 143, MEM-P0 region information reserving unit 241, MEM-P region information reserving unit 242, MEM-P0 memory mapping unit 243, MEM-P0 memory discharging unit 244, and system call processing unit 240.

The direct mapping region reserving unit 130 sets up, in response to the activation of OS 1221, the virtual memory space 20 corresponding to the physical memory space 10. The user mapping possibility flag 131 indicates whether a process can map. The page directory initializing unit 132 initializes a table for direct mapping from the virtual memory space 20 to the physical memory space 10 for each process when the process is created. The table set 143 manages a plurality of tables for managing the virtual memory region of each process. The MEM-P0 region information reserving unit 241 reserves the virtual address and size of MEM-P0 allocated to each process. The MEM-P region information reserving unit 242 reserves the virtual address and size of MEM-P allocated to each process. The MEM-P0 memory mapping unit 243 maps the memory for each process. The MEM-P0 memory discharging unit 244 discharges the memory mapped to a process. The system call processing unit 240 distributes the handling of system calls.

The OS 1221 is activated by the startup unit 1240. The OS 1221 includes the following: direct mapping region existence determining unit 102, general purpose processing unit 110, direct mapping region access driver 120, direct mapping region reserving unit 130, memory mapping unit 243, and so forth. The direct mapping region existence determining unit 102 determines whether there is a direct mapping region 22. The general purpose processing unit 110 manages the access to the virtual memory system for general purposes. The direct mapping region access driver 120 manages the access to the virtual memory space 20 without the involvement of the general purpose processing unit 110.

The general purpose processing unit 110 further includes the following: virtual memory processing unit 111, page table managing unit 112, and exception processing unit 113. The virtual memory processing unit 111 manages the access to the virtual memory system. The page table managing unit 112 manages each page of the regions in use of the virtual memory space 20. The exception processing unit 113 manages the exceptions of the access to the virtual memory space 20.

The direct mapping region access driver 120 includes the following: address translating unit 121 for the kernel, physical address translating unit 122, and designated region existence determining unit 123, The address translating unit 121 for maps physical addresses corresponding to the addresses of the direct mapping region MEM-P0 of a virtual memory region for each process to a virtual memory space that the OS 1221 can access. The physical address translating unit 122 translates the user virtual address of the direct mapping region to a corresponding physical address. The designated region existence determining unit 123 determines whether the region designated with its address and its size exists in the direct mapping region of the virtual memory space 20 for each process.

A process managing unit 200 creates a process needed to execute a software program, and discharges the process when the process is completed. The process managing unit 200 initializes a table for mapping to MEM-P region 222 that enables CPU 1304 to access MEM-P 1306 at a high speed and for mapping to MEM-PO region 221 that enables a process to be accessed directly by activating the page directory initializing unit 132.

The page directory initializing unit 132 initializes the table that is used for mapping to MEM-P region 222 and the MEM-PO region 221.

Each activated process further issues a system call thereby to initialize the table through which the activated process can directly access the MEM-PO region 221.

When the process issues the system call, the system call processing unit 240 activates a processing unit that corresponds to the category of the system call. For example, the issuing of a system call by a process is the calling of "sysarch" function.

If the system call is to acquire the information of the MEM-P region, the system call processing unit 240 activates MEM-P region information reserving unit 242. If the system call is to acquire the information of MEM-PO region, the system call processing unit 240 activates MEM-PO region information reserving unit 241. If the system call is to map memory to MEM-PO region 221, the system call processing unit 240 activates MEM-PO memory mapping unit 243. If the system call is to discharge memory mapped to MEM-PO region 221, the system call processing unit 240 activates MEM-PO memory discharging unit 244.

As described above, the memory mapping to MEM-PO region 221 is performed by a system call of each process. For example, a region mapped to MEM-PO region 221 by process A is accessible from process B by designating the same address as designated by process A. Process A and process B can share the same region in MEM-PO region 221.

Figure 16:
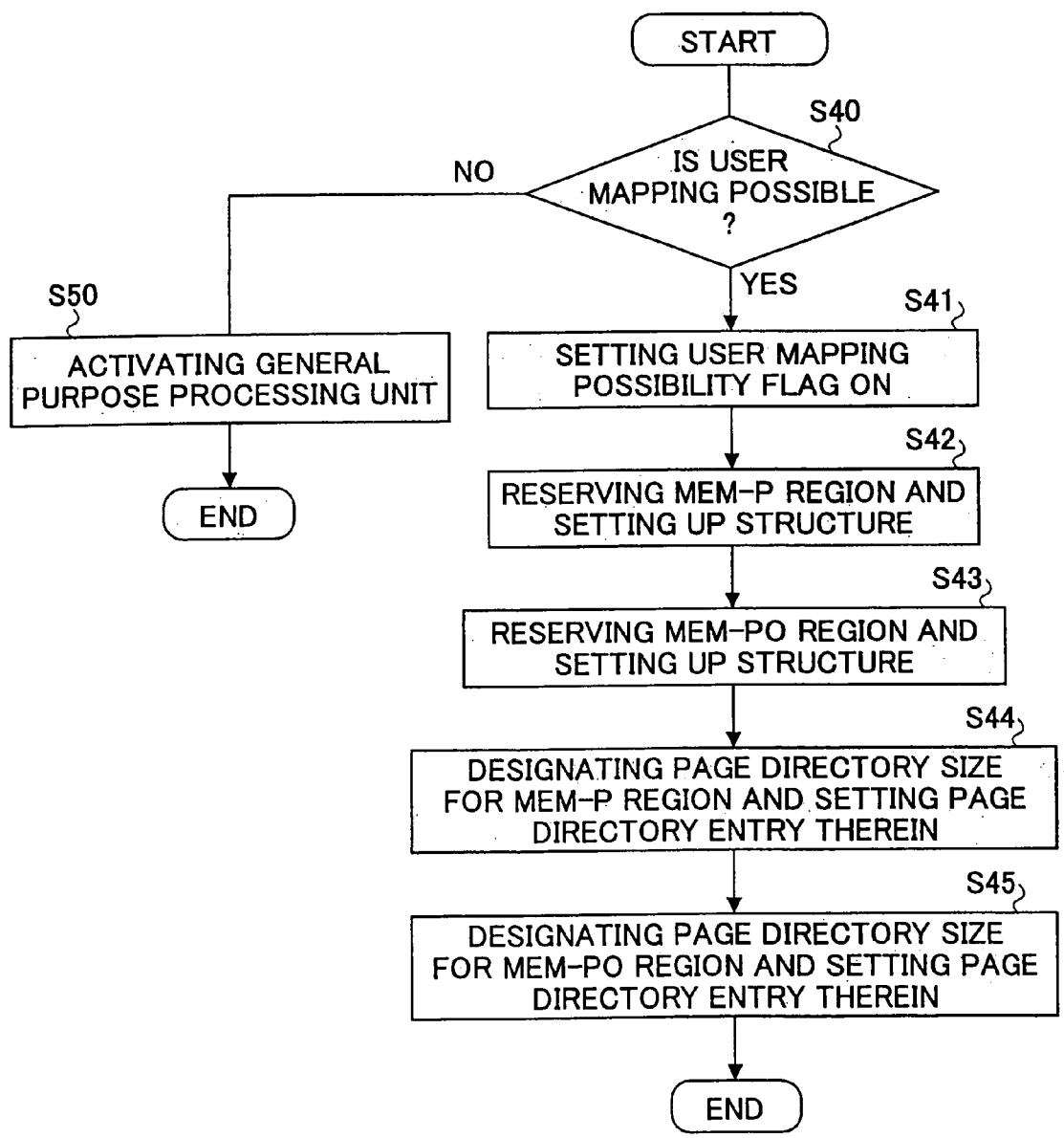
FIG. 16 is a flow chart showing the operation of a direct mapping region acquiring unit according to an embodiment.

A method of managing MEM-PO region 221 and MEM-P region 222 of the direct mapping region 22 will be described below. The operation of direct mapping region reserving unit 130 will be described by reference to a flow chart showed in FIG. 16. FIG. 16 is a flow chart for explaining the operation of the direct mapping region reserving unit 130.

When OS 1221 is activated by multifunctional apparatus startup unit 1240, CPU 1304 determines whether the virtual memory region for each process of the application 1230 is to be enabled to map MEM-PO region 13 (step S40). For example, the determination is made based on whether CPU 1304 can handle pages of 4 MB in size at a high speed.

CPU 1304 turns on a user mapping possibility flag 131 in a predetermined region indicating that paging by 4 MB is possible (step S41) The user mapping possibility flag 131 may be set up in a predetermined register (for example, a control register of CPU 1304).

If the user mapping is not possible (No branch of S40), general purpose processing unit 110 is activated and manages the memory conventionally. If user mapping is possible (Yes branch of S40), the kernel causes direct mapping region reserving unit 130 to set up a structure of MEM-P region 222 of the direct mapping region 22 of the virtual memory space 20 in the virtual memory region of the kernel (step S42). The kernel further sets up a structure of the MEM-PO region 221 (step S43).

Kernel designates the size of a page directory of MEM-P region 222 and causes direct mapping region reserving unit 130 to set up a page directory entry in the page directory for MEM-P region 222 of the virtual memory region for each process. Accordingly, CPU 1304 can directly access MEM-P region 222 at a high speed without exception processing to translate from the virtual address to the physical address.

Kernel designates the size of page directory of MEM-PO region 221 and causes the direct mapping region reserving unit 130 to set up a page directory entry in a page directory for MEM-PO region 221 of the virtual memory region for each process (step S45). It is preferable that the page size be the maximum size (for example, 4 MB) that CPU 1304 can handle.

The page directory entry (PDE) set up in a page directory (PD) indicates the top of each page table. Each page table is managed by table set 143. A detailed description on the page directory will be given later. When each entry of the page directory is initialized, the following information is set up in each entry: a base physical address of the page table (PT) indicated by the offset from the top of the page where data are stored therein, the designated page size (for example, 4 KB), whether user access is allowed, whether reading and writing is possible, and whether the page is valid.

After processing by direct mapping region reserving unit 130, when an application program 1230 is activated and a process (process A, for example) is created, process managing unit 200 makes an entry corresponding to the process A in the table managed by table set 143 to map the virtual address space for the created process A.

Figure 17:
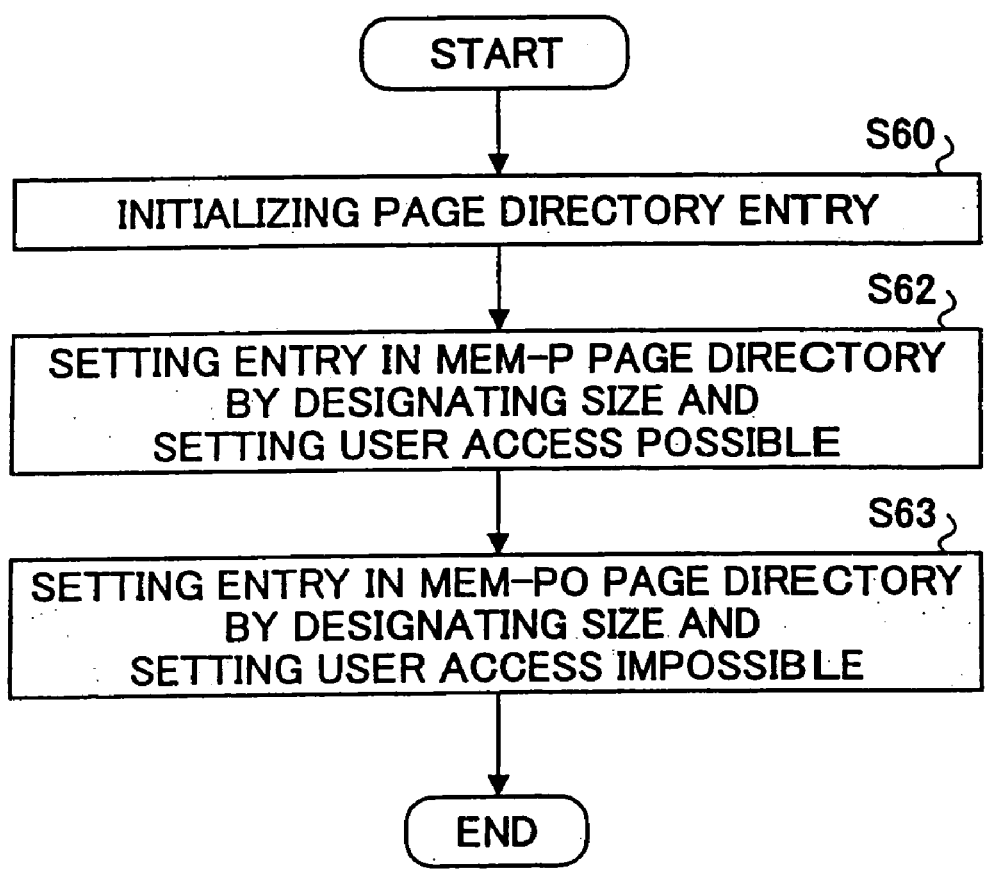
FIG. 17 is a flow chart showing the operation of a page directory initializing unit according to an embodiment.

When a process is created, page directory initializing unit 132 showed in FIG. 15 initializes the page directory of the virtual memory region for the process. The initializing operation performed by page directory initializing unit 132 will be described in more detail by reference to FIG. 17. The flow chart showed in FIG. 17 explains the initializing operation.

As showed in FIG. 8, page directory initializing unit 132 initializes a page directory entry corresponding to the process (step S60).

Designating the size of page directory for MEM-P region 222 of the virtual memory space 20, page directory initializing unit 132 sets up a page directory entry in the page directory for MEM-P region 222 of the virtual memory space 20 and sets the page to be user accessible (step S62). A physical address of a page is set in each page directory entry for MEM-P region 222, which enables CPU 1304 to access the page.

Designating the size of page directory for MEM-PO region 221 of the virtual memory space 20, the page directory initializing unit 132 further sets up a page directory entry in the page directory for MEM-PO region 221 of the virtual memory space 20 and sets the page to not be user accessible (step S63). A physical address of a page table that manages a page is further set in each page directory entry of MEM-PO region 221. Then, the initializing operation of the page directory corresponding to the process A is completed.

A process cannot access MEM-P0 region 221 mapped by each page directory entry of the page directory of MEM-PO region 221, but can access MEM-P region 222 mapped by each page directory entry of the page directory of MEM-P region 222.

Figure 18:
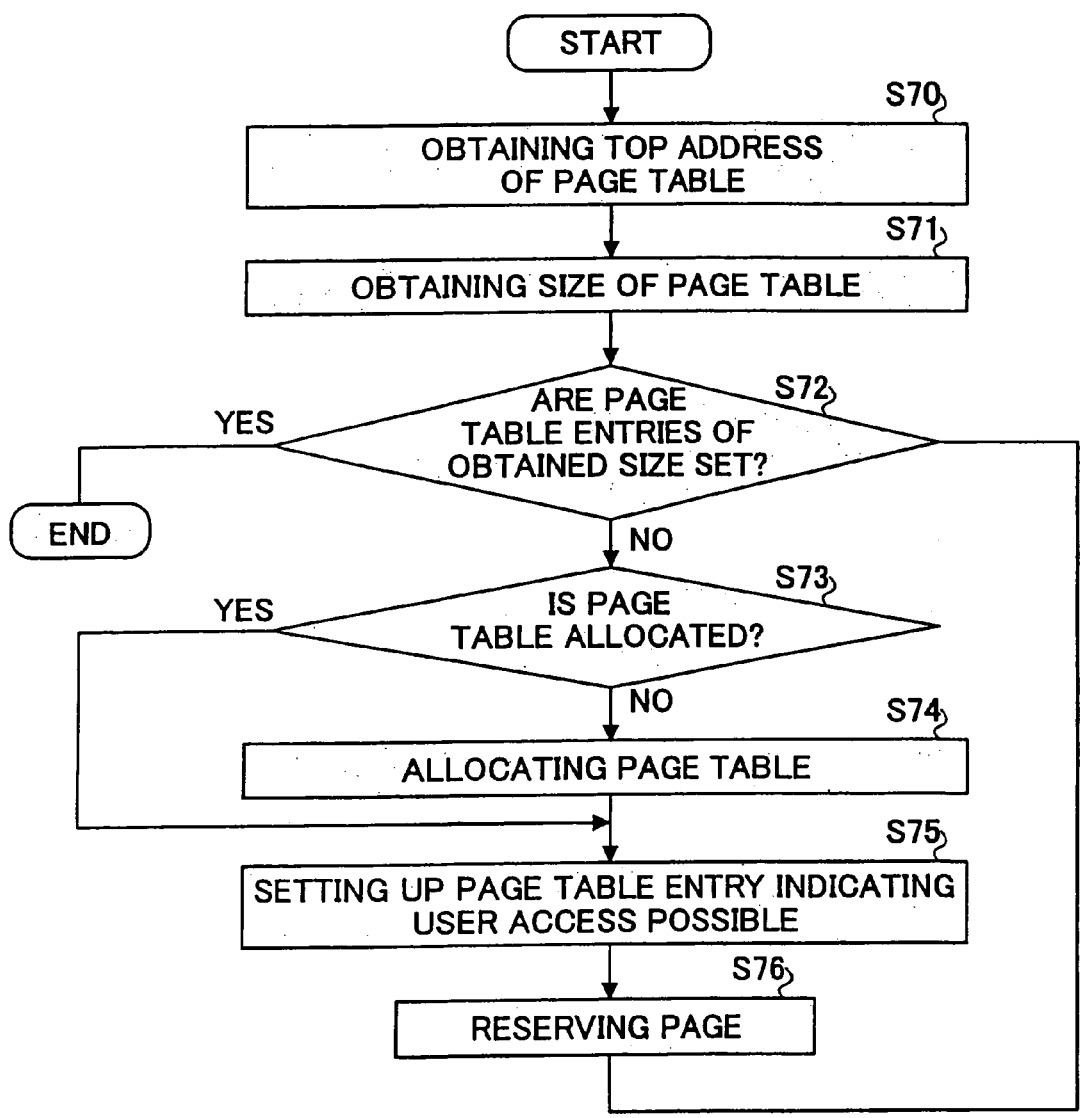
FIG. 18 is a flow chart for explaining memory mapping to MEM-PO region.

The created process A reserves MEM-PO region 221, which the process A can directly access by issuing a system call. FIG. 18 is a flow chart for explaining the mapping operation to the MEM-PO region. As showed in FIG. 15, when the process A gives an instruction to acquire MEM-PO region information by issuing a system call, system call processing unit 240 activates MEM-PO region information reserving unit 241. The MEM-PO region information reserving unit 241 reserves the top address of the page table designated by the system call (step S70), and obtains the designated size of page table (step S71).

Then, MEM-PO region information reserving unit 241 determines whether a page table entry of the size is set up (step S72). If a page table entry of the size is set up, processing of MEM-PO region information reserving unit 241 ends. On the other hand, if a page table entry of the size is not set up yet, MEM-PO region information reserving unit 241 further determines whether another page table is allocated (step S73). If another page is not allocated, another page table is allocated (step S74). If another page table is allocated, step S74 is skipped.

MEM-PO memory mapping unit 243 sets a page table entry (PTE) indicating that a page is user accessible (step S75), and reserves the page (step S76). The following information is set in a page table entry: a base physical address indicating the top address of the page, whether the page is user accessible, whether the page is readable and writable, and whether the page is already created. As a result of the above operation, a portion of MEM-PO region 221 is mapped to the MEM-PO region 13 of the physical memory space 10.

Likewise, if the process B performs memory mapping from MEM-PO region 221 of the virtual memory space 20 to MEM-PO region 13 of the physical memory space 10, the process B can also access the MEM-PO region 13 of the physical memory 10. Further, if the 5 process B performs memory mapping from MEM-PO region 221 to the same region of MEM-PO region 13 of the physical memory space 10 as the process A maps, the region of MEM-PO region 13 becomes accessible from the process A and the process B. Both processes can share the same region.

Figure 19A:
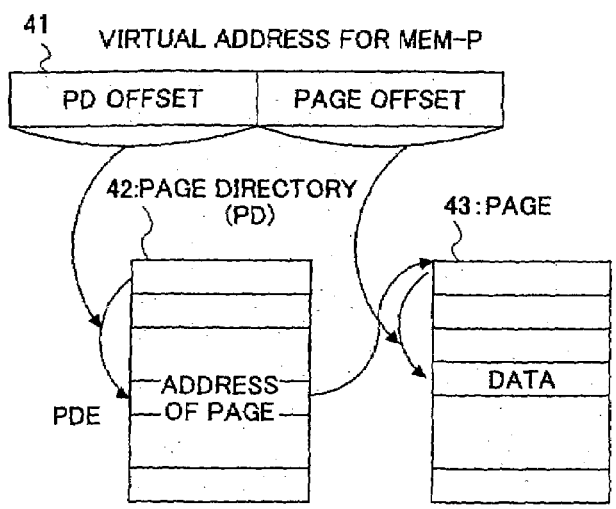
FIGS. 19A and 19B are schematic diagrams showing the relationship between the virtual address of the direct mapping region and tables.
Figure 19B:
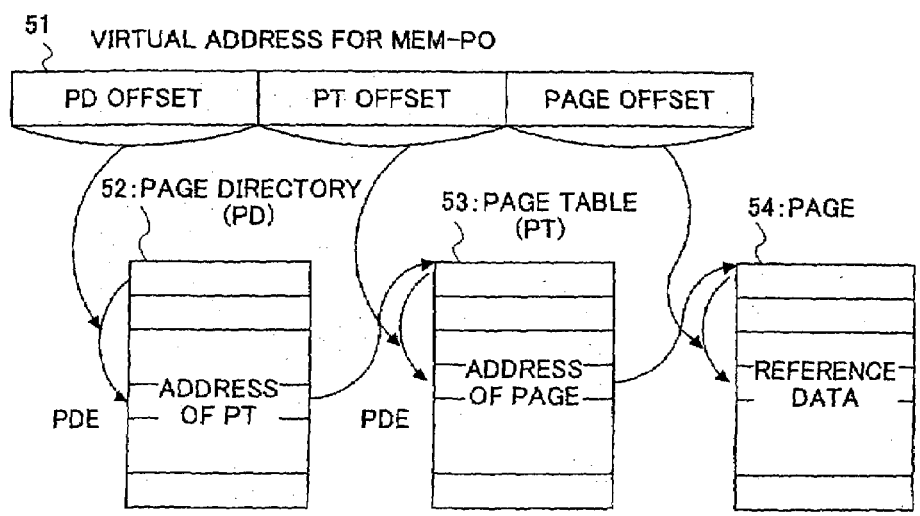

FIGS. 19A and 19B are schematic diagrams for explaining the relationship between a virtual address of the direct mapping region and a table. The relationship between the virtual address of MEM-P region and the table is showed in FIG. 19A. The virtual address 41 of the MEM-P region consists of a page directory (PD) offset and a page offset.

A page directory 42 used for the MEM-P region manages page directory entries (PDE) each indicating a base physical address of a page having a predetermined size (4 MB for example). The position of a page directory entry is determined by adding the PD offset of the virtual address 41 for MEM-P to a predetermined base physical address of the page directory 42.

Reference data are stored in pages 43 pointed to by the page directory entry by the page of the predetermined size (4 MB for example). The page position of the reference data is determined by adding the base physical address set at the page directory entry to the page offset of the virtual address 41 of MEM-P region.

MEM-PO virtual address 51 consists of a page directory (PD) offset, a page table (PT) offset, and a page offset. The page directory 52 used for MEM-PO manages the page directory entry (PDE) each indicating a base physical address of the page table 53. The position of the page directory entry is determined by adding the PD offset of MEM-PO virtual address 51 to the predetermined base physical address of the page directory 52

Page table entries are stored in a page table (PT) pointed to by the page directory entry. Each page table entry (PTE) indicates base physical address of a page 54 having a predetermined size (4 KB for example). Reference data are stored in the page 54 and accessed by the process. The position of a page table entry (PTE) is determined by adding the page table offset of the virtual address for MEM-PO to the base physical address indicated in the page directory entry.

Reference data are divided into a plurality of pages having a predetermined size (4 KB for example) and are stored in the page set 54 at which base physical address is pointed to by the page table entry. The page size of the MEM-PO region is smaller than that of the MEM-P region. The position of the reference data is determined by adding the page offset of MEM-PO virtual address 51 to the base physical address set in the page table entry.

The page directory entry and the page table entry will be described by reference to FIGS. 20A and 20B. As showed in FIG. 20A, the page directory entry (PDE) is 32 bits long including the base physical address of the page table, page size, and flags indicating whether the page table is user accessible, whether the page table is readable and writable, and whether the page is already mapped. The flag indicating whether the page table is user accessible is set at "accessible" when the page directory entry of the MEM-P region is set at step S62 of FIG. 17.

Accordingly, CPU 1304 can directly access a region in the physical memory pointed to by the base physical address indicated by the page table of the page directory entry. In this case, the page table is a page in which reference data are stored. On the other hand, the page directory entry for MEM-PO region is set "user un-accessible" at step S63 of FIG. 17.

As showed in FIG. 20B, a page table entry includes a base physical address and flags indicating user accessibility, readability/writability, and existence. The page table entry for the MEM-PO region is set up in response to a system call in compliance with the flow chart of FIG. 18, and is set at "user accessible" at step S75.

The paging operation described above is based on Intel 80×86 (trade mark) processors. This paging operation is characterized by MEM-P region 14 which CPU 1304 can directly access and MEM-PO region 13 to which a process can directly map by making a system call.

FIGS. 21A–21D are schematic diagrams for explaining how data are shared between plural processes.

Figure 21A:
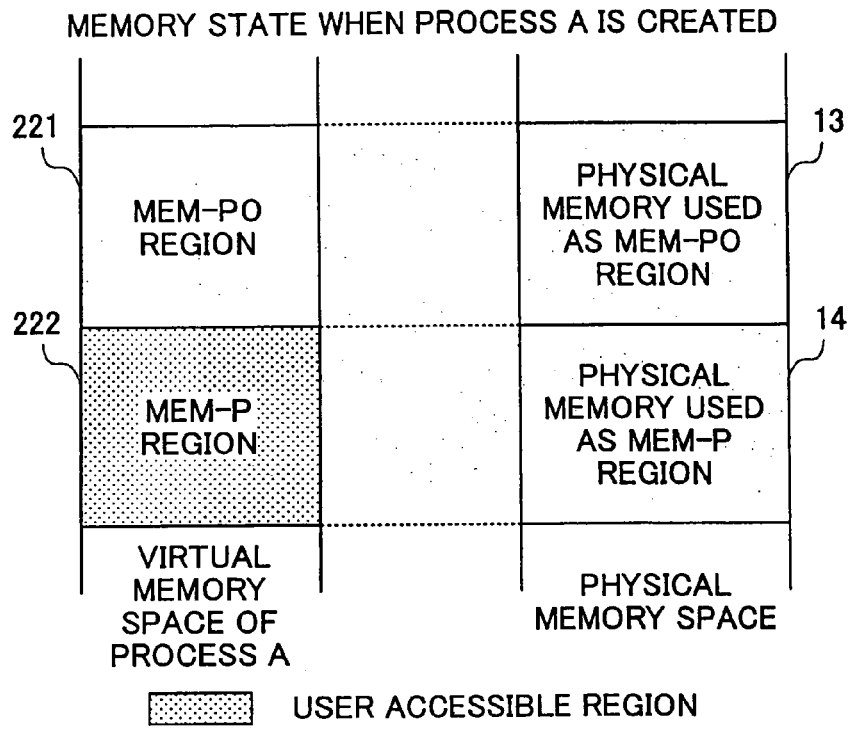
FIGS. 21A–21D are schematic diagrams for explaining the data sharing of processes.

FIG. 21A is a schematic diagram showing the relationship between the virtual memory region of the process A and the physical memory when the process A is created. As showed in FIG. 21A, when created, the process A can access to MEM-P region 222 (step S60 of FIG. 17), but cannot access to MEM-PO region 221 (step S61 of FIG. 18).

Figure 21B:
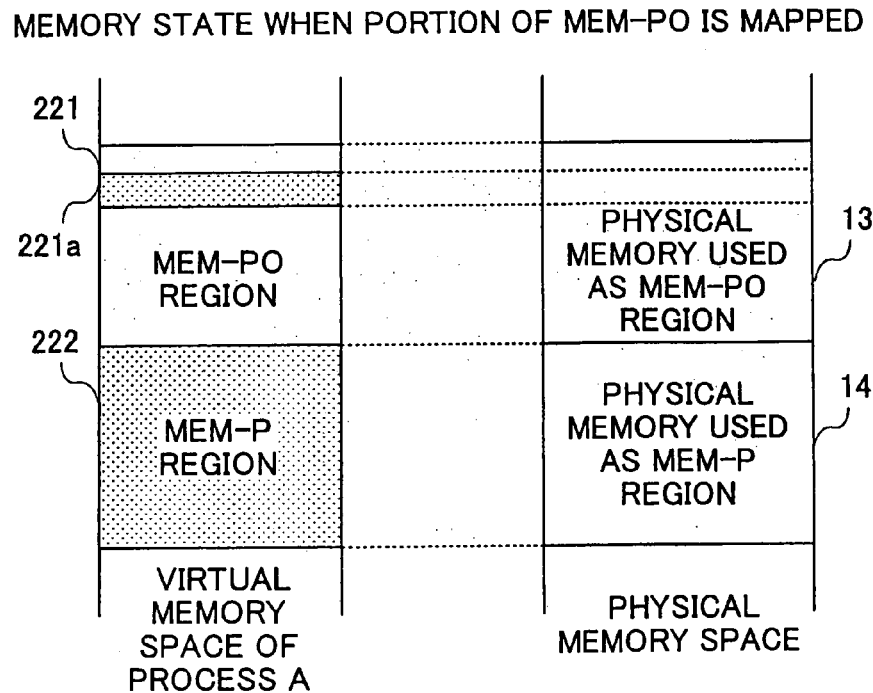
Figure 21C:
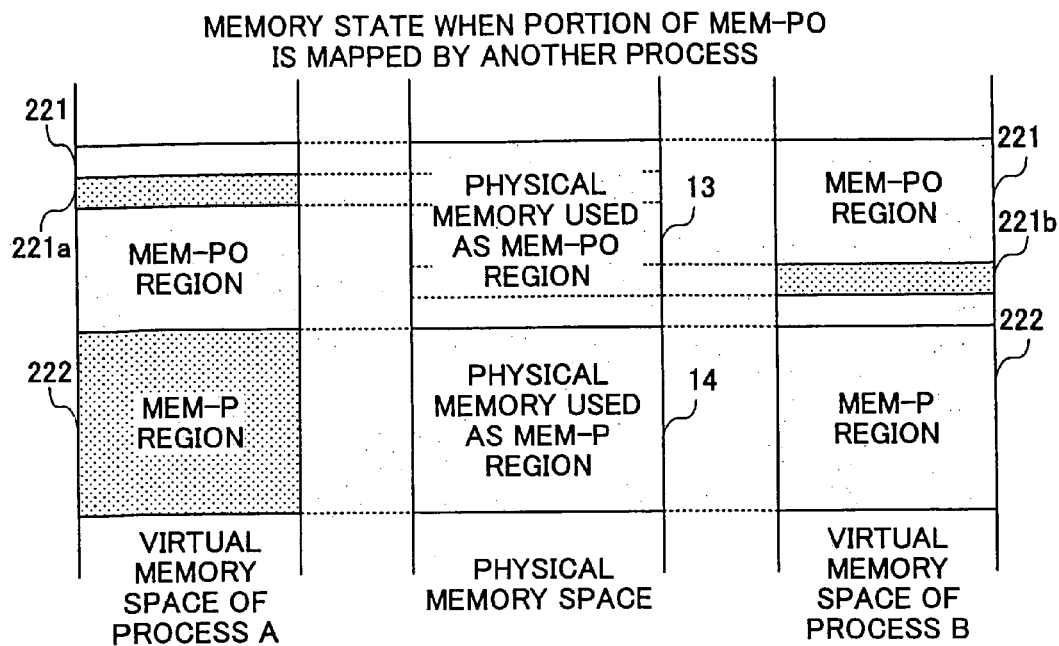

As showed in FIG. 21B, when the process A maps a portion 221a of MEM-PO region 221 by activating MEM-PO memory mapping unit 243 through a system call, the portion 221a of MEM-PO region 221 becomes accessible from the process A.

Likewise, when the process B is created during the operation of the process A, the process B can access to MEM-P region 222. As showed in FIG. 21C, if the process B maps a portion 221b of MEM-PO region 221 by activating MEM-PO memory mapping unit 243 through a system call, the portion 221b of MEM-PO region 221 becomes-accessible from the process B.

In this case, the process A and the process B map different portions in the same MEM-PO region 221. Accordingly, the process A cannot access to the region 221b mapped by the process B, and the process B cannot access to the region 221a mapped by the process A.

Figure 21D:
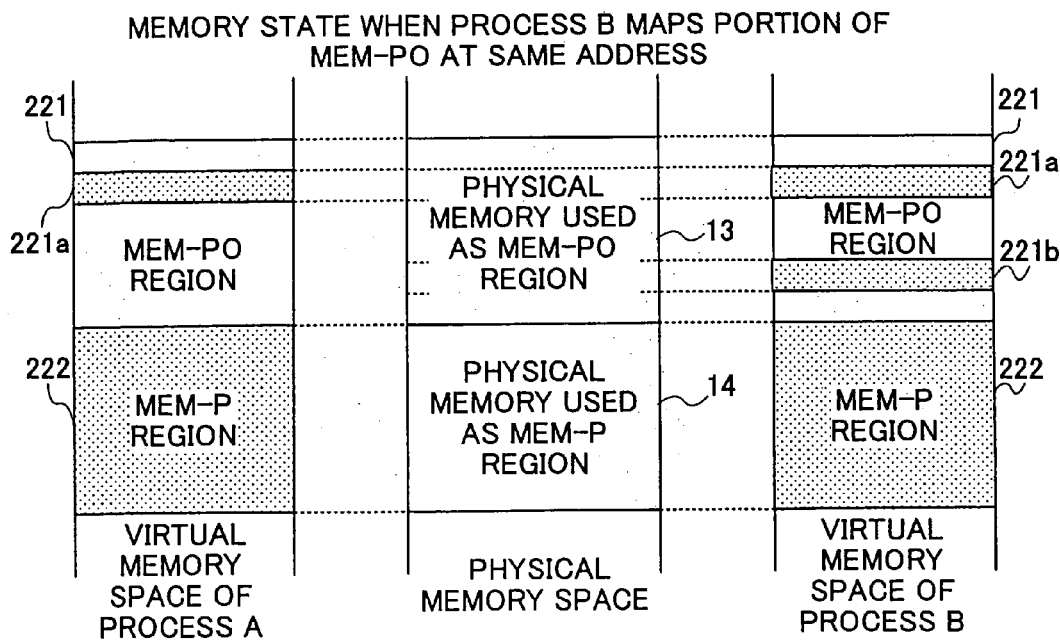

As showed in FIG. 21D, if the process B maps the region 221a that is already mapped by the process A, the region 221a becomes accessible by the process B. As a result, the process A and the process B can access the same region in the physical memory. Accordingly, the process A and the process B can share the same region in the physical memory.

In the above description, two processes, A and B, share a region of the physical memory. However, more than two processes may share the same region in the physical memory. If the same data are mapped to different regions in the physical memory, the memory resource is wasted. Since it is not necessary to store identical data in different regions and to transfer the identical data between the regions, the information processing apparatus according to the present invention can improve the efficiency in memory management.

Figure 2:
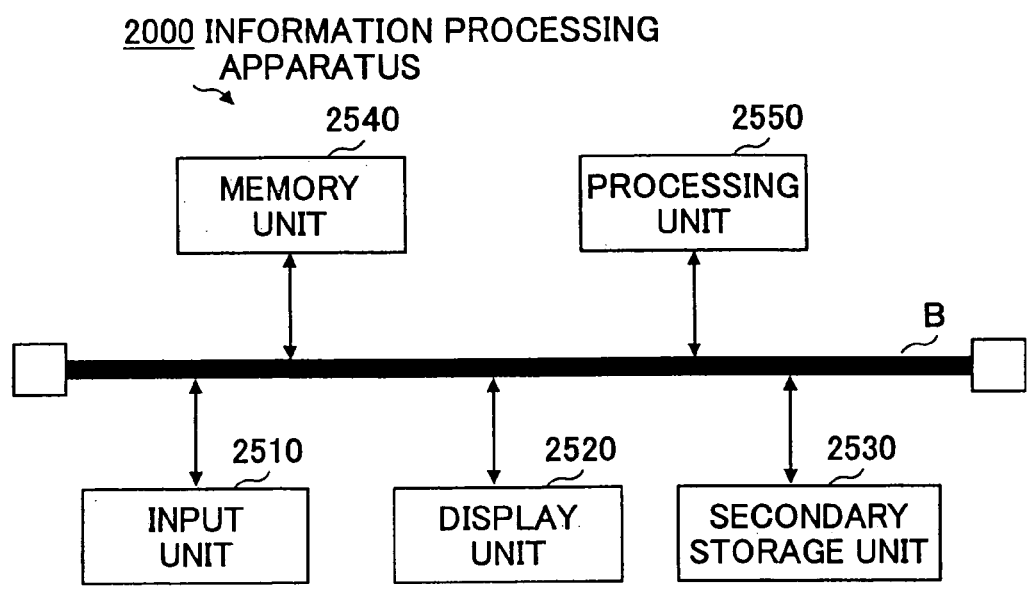
FIG. 2 is a schematic diagram showing the hardware configuration of the information processing apparatus of FIG. 1.

In this detailed description of embodiments, the multi-functional apparatus 1200 is mainly described. However, the present invention is easily applicable to the information processing apparatus 2000 showed in FIGS. 2 and 3. In the case of the information processing apparatus 2000, the applications 2210-1 through 2210-n and other computer programs, when processes are created, give instructions to the system call processing unit 240.

The preferred embodiments of the present invention are described above. The present invention is not limited to these embodiments, but various variations and modifications may be made without departing from the scope of the present invention.

This patent application is based on Japanese priority patent applications No. 2002-048514 filed on Feb. 25, 2002, No. 2002-048515 filed on Feb. 25, 2002, No. 2003-44585 filed on Feb. 21, 2003, No. 2003-44586 filed on Feb. 21, 2003, No. 2003-44587 filed on Feb. 21, 2003, and No. 2003-44588 filed on Feb. 21, 2003, the entire contents of which are hereby incorporated by reference.

What is claimed is:

1. An information processing apparatus that maps a virtual memory region of a process over a physical memory space, comprising:
a region reserving unit that reserves, in said physical memory space, a direct mapping region over which said virtual memory region can be directly mapped by said process; and
an address translating unit that correlates a physical address of said direct mapping region with a virtual address of said virtual memory region, wherein, if a plurality of the virtual addresses of said virtual memory region are continuous, a processor reserves, in said physical memory space, a continuous direct mapping region so that a plurality of the physical addresses of said direct mapping region corresponding to said virtual addresses become continuous.

2. The information processing apparatus as claimed in claim 1, wherein said virtual memory region is managed by a page of a predetermined size.

3. The information processing apparatus as claimed in claim 1, further comprising an address updating unit that updates contents of said address translating unit correlating the physical address of said direct mapping region with the virtual address of said virtual memory region without using a virtual memory system.

4. The information processing apparatus as claimed in claim 3, wherein said address updating unit updates said contents of said address translating unit when said process is created.

5. The information processing apparatus as claimed in claim 1, wherein said region reserving unit reserves said direct mapping region when the information processing apparatus is started.

6. The information processing apparatus as claimed in claim 1, wherein said address translating unit is an address translating table correlating, for each process, the physical address of said direct mapping region with a virtual address of said direct mapping region, said address translating unit being provided in a kernel.

7. The information processing apparatus as claimed in claim 1, wherein said address translating unit is an address translating table correlating, for each process, the physical address of said direct mapping region with the virtual address of said virtual memory region, said address translating unit being provided in a processor.

8. The information processing apparatus as claimed in claim 7, wherein said address translating unit correlates the physical address of said direct mapping region with the virtual address of said virtual memory region using a portion of said address translating table in which portion an entry is protected from being overwritten.

9. The information processing apparatus as claimed in claim 1, wherein, when a plurality of the processes are created, said address translating unit correlates the virtual memory regions of respective processes with said direct mapping region so that the processes can share said direct mapping region.

10. The information processing apparatus as claimed in claim 3, wherein
a virtual memory space includes a user program region and a stack region that are managed by said virtual memory system; and
a region in said virtual memory space left unused and unmanaged by said virtual memory system is mapped over said direct mapping region.

11. A method of managing a physical memory space provided to an information processing apparatus that maps a virtual memory region of a process over said physical memory space, comprising the steps of:
reserving a direct mapping region in said physical memory space over which said virtual memory region can be directly mapped by said process;
correlating a physical address of said direct mapping region with a virtual address of said virtual memory region, wherein, in the step of correlating, if a plurality of the virtual addresses of said virtual memory region are continuous, a continuous direct mapping region is correlated with said virtual memory region so that a plurality of the physical addresses of said direct mapping region corresponding to said virtual addresses becomes continuous.

12. The method as claimed in claim 11, wherein said virtual memory region is managed by a page of a predetermined size.

13. The method as claimed in claim 11, wherein, in the step of correlating, a corresponding relationship between said physical address and said virtual address can be updated without using a virtual memory system.

14. The method as claimed in claim 13, wherein, in the step of correlating, said corresponding relationship is updated when said process is activated.

15. The method as claimed in claim 11, wherein, when said information processing apparatus is started, said direct mapping region is reserved in the step of reserving.

16. The method as claimed in claim 11, wherein, in the step of correlating, an address translating table of each process, provided in a kernel of an operating system, correlates the physical address of said direct mapping region with the virtual address in said virtual memory region.

17. The method as claimed in claim 11, wherein, in the step of correlating, an address translation table of each process, provided in a processor, correlates the physical address of said direct mapping region with the virtual address in said virtual memory region.

18. The method as claimed in claim 17, wherein, in the step of correlating, said physical address of said direct mapping region is correlated with said virtual address in said virtual memory region of said process using a portion of said address translating table in which portion entries are protected from being overwritten.

19. The method as claimed in claim 11, wherein, when a plurality of the processes are created, said address translating unit correlates a physical address of said direct mapping region with virtual addresses of the virtual memory regions of the processes so that the processes can share data stored in said direct mapping region.

20. The method as claimed in claim 13, wherein
a virtual memory space includes a user program region and a stack region that are managed by said virtual memory system; and
a region in said virtual memory space left unused and unmanaged by said virtual memory system is mapped over said direct mapping region.

21. An image forming apparatus that maps a virtual memory region of a process of an application program and a virtual memory region of a process of a control service used in image forming processing over a physical memory space, comprising:
a region reserving unit that reserves, in said physical memory space, a direct mapping region over which the virtual memory regions can be directly mapped by the processes; and
an address translating unit that correlates physical addresses of said direct mapping region with virtual addresses of the virtual memory regions, wherein, if a plurality of the virtual addresses of the virtual memory regions are continuous, a processor reserves, in said physical memory space, a continuous direct mapping region so that a plurality of the physical addresses of said direct mapping region corresponding to the virtual addresses become continuous.

22. The information processing apparatus as claimed in claim 21, wherein the virtual memory regions are managed by a page of a predetermined size.

23. The information processing apparatus as claimed in claim 21, further comprising an address updating unit that updates contents of said address translating unit correlating the physical address of said direct mapping region with the virtual addresses of the virtual memory regions without using a virtual memory system.

24. The information processing apparatus as claimed in claim 23, wherein said address updating unit updates said contents of said address translating unit when the processes are created.

25. The information processing apparatus as claimed in claim 21, wherein said region reserving unit reserves said direct mapping region when the information processing apparatus is started.

26. The information processing apparatus as claimed in claim 21, wherein said address translating unit is an address translating table correlating, for each process, the physical address of said direct mapping region with virtual addresses of the virtual memory regions, said address translating unit being provided in a kernel.

27. The information processing apparatus as claimed in claim 21, wherein said address translating unit is an address translating table correlating, for each process, the physical address of said direct mapping region with the virtual address of the virtual memory region, said address translating unit being provided in a processor.

28. The information processing apparatus as claimed in claim 27, wherein said address translating unit correlates the physical address of said direct mapping region with the virtual address of the virtual memory regions using a portion of said address translating table in which portion an entry are protected from being overwritten.

29. The image forming apparatus as claimed in claim 21, wherein, when a plurality of the processes are created, said address translating unit correlates the virtual memory regions of respective processes with said direct mapping region so that the processes can share said direct mapping region.

30. The image forming apparatus as claimed in claim 23, wherein
a virtual memory space includes a user program region and a stack region that are managed by said virtual memory system; and
a region in said virtual memory space left unused and unmanaged by said virtual memory system is mapped over said direct mapping region.

31. A method of managing a physical memory space provided to an image forming apparatus that maps a virtual memory region of a process of an application program that performs image forming processing or a process of control service managing hardware resources used for image forming, comprising the steps of:
reserving a direct mapping region in said physical memory space over which said virtual memory region can be directly mapped by the processes; and
correlating a physical address of said direct mapping region with a virtual address of said virtual memory region, wherein, in the step of correlating, if a plurality of the virtual addresses of said virtual memory region are continuous, a continuous direct mapping region is correlated with said virtual memory region so that a plurality of the physical addresses of said direct mapping region corresponding to said virtual addresses become continuous.

32. The method as claimed in claim 31, wherein said virtual memory region is managed by a page of a predetermined size.

33. The method as claimed in claim 31, wherein, in the step of correlating, a corresponding relationship between said physical address and said virtual address can be updated without using a virtual memory system.

34. The method as claimed in claim 33, wherein, in the step of correlating, said corresponding relationship is updated when said process is activated.

35. The method as claimed in claim 31, wherein, when said image forming apparatus is started, said direct mapping region is reserved in the step of reserving.

36. The method as claimed in claim 31, wherein, in the step of correlating, an address translating table of each process, provided in a kernel of an operating system, correlates the physical address of said direct mapping region with the virtual address in said virtual memory region.

37. The method as claimed in claim 31, wherein, in the step of correlating, an address translation table of each process, provided in a processor, correlates the physical address of said direct mapping region with the virtual address in said virtual memory region.

38. The method as claimed in claim 37, wherein, in the step of correlating, said physical address of said direct mapping region is correlated with said virtual address in said virtual memory region of said process using a portion of said address translating table in which portion entries are protected from being overwritten.

39. The method as claimed in claim 31, wherein, in the step of correlating, when a plurality of the processes are created, a physical address of said direct mapping region is correlated with virtual addresses of virtual memory regions of the processes so that the processes can share data stored in said direct mapping region.

40. The method as claimed in claim 33, wherein
a virtual memory space includes a user program region and a stack region that are managed by said virtual memory system; and
a region in said virtual memory space left unused and unmanaged by said virtual memory system is mapped over said direct mapping region.

41. An information processing apparatus that maps a virtual memory region of a process over a physical memory space, comprising:
a first reserving unit that reserves, in said physical memory space, a first direct mapping region over which said virtual memory region can be directly mapped, said first direct mapping region being directly accessible by a processor;
a first mapping unit that directly maps said virtual memory region over a first physical memory region in said first direct mapping region by setting, in a page directory entry, a physical address indicating said first physical memory region;
a second reserving unit that reserves, in said physical memory space, a second direct mapping region over which said virtual memory region can be directly mapped; and
a second mapping unit that directly maps said virtual memory region over a second physical memory region in said second direct mapping region by setting, in a page table entry, a physical address indicating said second physical memory region through a system call of said process.

42. The information processing apparatus as claimed in claim 41, wherein said second mapping unit directly activates, through the system call, a mapping processing unit of an operating system that maps said virtual memory region of said process over said second physical memory region in said second direct mapping region.

43. The information processing apparatus as claimed in claim 41, wherein said first mapping unit maps said virtual memory region of said process over said first direct mapping region by a first page size; and said second mapping unit maps said virtual memory region of said process over said second direct mapping region by a second page size.

44. The information processing apparatus as claimed in claim 43, wherein said first page size is larger than said second page size.

45. The information processing apparatus as claimed in claim 43, further comprising a determining unit that determines, when an operating system is activated, whether said first page size is supported;

wherein said first reserving unit, said first mapping unit, said second reserving unit, and said second mapping unit are enabled based on the determination of said determining unit.

46. The information processing apparatus as claimed in claim 41, wherein said physical memory space is used for image forming.

47. A method of mapping a virtual memory region of a process over a physical memory space, comprising the steps of:

reserving, in said physical memory space, a first direct mapping region over which said process can directly map said virtual memory region, said first direct mapping region being directly accessible by a processor;

directly mapping said virtual memory region over a first physical memory region in said first direct mapping region by setting, in a page directory entry, a physical address indicating said first physical memory region;

reserving, in said physical memory space, a second direct mapping region over which said process can directly map said virtual memory region; and directly mapping, through a system call of said process, said virtual memory region over a second physical memory region in said second direct mapping region reserved in the step of reserving said second direct mapping region by setting, in a page table entry, a physical address indicating said second physical memory region.

48. The method as claimed in claim 47, wherein a flag indicating user accessibility is set in said page directory entry in the step of directly mapping said virtual memory region over said first physical memory region.

49. The method as claimed in claim 47, wherein a flag indicating user accessibility is set in said page table entry in the step of directly mapping said virtual memory region over said second physical memory region.

50. An image forming apparatus that maps a virtual memory region of a process of an application program that performs image forming processing or a process of a control service that manages hardware resources used for image forming processing over a physical memory space, comprising:

a first reserving unit that reserves, in said physical memory space, a first direct mapping region over which said virtual memory region can be directly mapped, said first direct mapping region being directly accessible by a processor;

a first mapping unit that directly maps said virtual memory region over a first physical memory region in said first direct mapping region by setting, in a page directory entry, a physical address indicating said first physical memory region;

a second reserving unit that reserves, in said physical memory space, a second direct mapping region over which said virtual memory region can be directly mapped; and a second mapping unit that directly maps said virtual memory region over a second physical memory region in said second direct mapping region by setting, in a page table entry, a physical address indicating said second physical memory region through a system call of said process.

51. The image forming apparatus as claimed in claim 50, wherein said second mapping unit directly activates, through the system call, a mapping processing unit of an operating system that maps said virtual memory region of said process over said second physical memory region in said second direct mapping region.

52. The image forming apparatus as claimed in claim 50, wherein said first mapping unit maps said virtual memory region of said process over said first direct mapping region by a first page size; and said second mapping unit maps said virtual memory region of said process over said second direct mapping region by a second page size.

53. The image forming apparatus as claimed in claim 52, wherein said first page size is larger than said second page size.

54. The image forming apparatus as claimed in claim 52, further comprising a determining unit that determines, when an operating system is activated, whether said first page size is supported;

wherein said first reserving unit, said first mapping unit, said second reserving unit, and said second mapping unit are enabled based on the determination of said determining unit.

55. The image forming apparatus as claimed in claim 50, wherein said physical memory space is used for image forming.

56. A method of mapping a virtual memory region of a process of an application program that performs image forming processing and a process of a control service that manages hardware resources used for image forming processing over a physical memory space, comprising the steps of:

reserving, in said physical memory space, a first direct mapping region over which said process can directly map said virtual memory region, said first direct mapping region being directly accessible by a processor;

directly mapping said virtual memory region over a first physical memory region in said first direct mapping region by setting, in a page directory entry, a physical address indicating said first physical memory region;

reserving, in said physical memory space, a second direct mapping region over which said process can directly map said virtual memory region; and directly mapping, through a system call of said process, said virtual memory region over a second physical memory region in said second direct mapping region reserved in the step of reserving said second direct mapping region by setting, in a page table entry, a physical address indicating said second physical memory region.

57. The method as claimed in claim 56, wherein a flag indicating user accessibility is set in said page directory entry in the step of directly mapping said virtual memory region over said first physical memory region.

58. The method as claimed in claim 56, wherein a flag indicating user accessibility is set in said page table entry in the step of directly mapping said virtual memory region over said second physical memory region.

* * * * *